(12) United States Patent
Seader

(10) Patent No.: US 12,234,883 B1
(45) Date of Patent: Feb. 25, 2025

(54) ROPE RESTRAINING AND SELECTIVE RELEASE DEVICE

(71) Applicant: Nite Ize, Inc., Boulder, CO (US)

(72) Inventor: Rex Seader, Superior, CO (US)

( * ) Notice: Subject to any disclaimer, the term of this patent is extended or adjusted under 35 U.S.C. 154(b) by 0 days.

(21) Appl. No.: 18/788,387

(22) Filed: Jul. 30, 2024

Related U.S. Application Data

(60) Provisional application No. 63/516,538, filed on Jul. 31, 2023.

(51) Int. Cl.
*F16G 11/10* (2006.01)

(52) U.S. Cl.
CPC .................................. *F16G 11/106* (2013.01)

(58) Field of Classification Search
CPC ...................................................... F16G 11/106
See application file for complete search history.

(56) References Cited

U.S. PATENT DOCUMENTS

| | | |
|---|---|---|
| 152,270 A | 6/1874 | Bird |
| 379,461 A | 3/1888 | Hanscom |
| 436,832 A | 9/1890 | Grange |
| 534,538 A | 2/1895 | Wilson |
| 548,074 A | 10/1895 | Lord |
| 557,630 A | 4/1896 | Widmer |
| 565,699 A | 8/1896 | Spencer |
| 580,214 A | 4/1897 | Marvel |
| 916,091 A | 3/1909 | Batzer |
| 1,005,797 A | 10/1911 | Bayer |
| 1,040,120 A | 10/1912 | Bayer |
| 1,063,354 A | 6/1913 | Kimlin |
| 1,063,973 A | 6/1913 | Houston |
| 1,065,390 A | 6/1913 | Palmer |
| 1,074,736 A | 10/1913 | Noll |
| 1,087,822 A | 2/1914 | Phalen |
| 1,140,409 A | 5/1915 | Smith |
| 1,143,874 A | 6/1915 | Yeakley |
| 1,250,876 A | 12/1917 | Hicks |
| 1,372,789 A | 3/1921 | Vanderdonck |
| 1,394,729 A | 10/1921 | Gutenkunst |
| 1,442,432 A | 1/1923 | Hooper |
| 1,485,045 A | 2/1924 | Meyer |
| 1,686,581 A | 10/1928 | Stewart |
| 1,810,320 A | 6/1931 | Michaelson |
| 2,194,679 A | 3/1940 | Suter |
| 2,423,731 A | 7/1947 | Schiefelbein |
| 2,445,267 A | 7/1948 | Hilblom |
| 2,942,315 A | 6/1960 | Johnson |

(Continued)

OTHER PUBLICATIONS

International Search Report and Written Opinion from related PCT/US2024/040133. Dec. 17, 2024. 15 Pages.

*Primary Examiner* — David M Upchurch

(74) *Attorney, Agent, or Firm* — FisherBroyles, LLP; Craig W. Mueller

(57) ABSTRACT

A rope restraining and selective release device is provided that may be incorporated with a carabiner or other device for selective interconnection to an anchor. The device employs a selectively rotatable cam lever with a plurality of teeth and gripping geometry that cooperates with the corresponding geometry in a rope cradle to restrain a rope. Tension in the rope will allow it to pass through the device in one direction, but tension in the opposite direction will prevent rope movement through the device.

6 Claims, 15 Drawing Sheets

(56) References Cited

U.S. PATENT DOCUMENTS

| | | | |
|---|---|---|---|
| 2,942,599 A | 6/1960 | Irgens | |
| 3,091,207 A | 5/1963 | Songer | |
| 3,112,816 A | 12/1963 | Halford | |
| 3,550,449 A | 12/1970 | Henson | |
| 3,583,242 A | 6/1971 | Thornbloom et al. | |
| 3,747,652 A | 7/1973 | Meadows | |
| 4,097,023 A | 6/1978 | Muller | |
| 4,162,561 A | 7/1979 | Tillemans | |
| 4,340,997 A | 7/1982 | Voss | |
| 4,397,253 A | 8/1983 | Uecker | |
| 4,620,499 A | 11/1986 | Slemmons | |
| 4,644,975 A | 2/1987 | Fricker | |
| 4,716,630 A | 1/1988 | Skyba | |
| 4,763,432 A | 8/1988 | Barclay | |
| 4,766,835 A | 8/1988 | Randall | |
| 4,805,334 A | 2/1989 | Barclay | |
| 4,993,123 A | 2/1991 | Siwek | |
| 4,998,327 A * | 3/1991 | Hull | F16G 11/106 |
| | | | D8/383 |
| 5,002,420 A * | 3/1991 | Loyd | B66C 1/36 |
| | | | 403/165 |
| 5,060,756 A | 10/1991 | D'Acquisto | |
| 5,133,111 A | 7/1992 | Brown | |
| 5,146,655 A | 9/1992 | Gibbs | |
| 5,325,613 A | 7/1994 | Sussmann | |
| 5,368,281 A | 11/1994 | Skyba | |
| 5,548,873 A | 8/1996 | Macias | |
| 5,845,894 A | 12/1998 | Zedel | |
| 5,931,112 A | 8/1999 | Lacan | |
| 5,987,710 A | 11/1999 | Paul et al. | |
| 6,068,242 A | 5/2000 | Kingery | |
| 6,115,889 A | 9/2000 | Mickelson | |
| 6,234,454 B1 | 5/2001 | Vassioukevitch | |
| 6,292,984 B1 | 9/2001 | Nelson | |
| 6,378,650 B2 | 4/2002 | Mauthner | |
| 6,742,770 B1 | 6/2004 | Vassioukevitch | |
| 6,793,046 B2 | 9/2004 | Zedel | |
| 7,073,780 B2 | 7/2006 | Stone | |
| 7,111,572 B1 | 9/2006 | Yang | |
| 7,222,840 B1 | 5/2007 | Stepper | |
| 7,234,686 B2 | 6/2007 | Stone | |
| 7,287,303 B2 | 10/2007 | Yang | |
| 7,428,769 B2 | 9/2008 | Fontaine et al. | |
| 7,445,195 B1 | 11/2008 | Huang | |
| 7,537,199 B1 | 5/2009 | Anderson | |
| 7,562,862 B1 | 7/2009 | Jackson | |
| 8,997,315 B2 | 4/2015 | LeBeau | |
| D746,126 S * | 12/2015 | LeBeau | D8/367 |
| 9,707,883 B1 | 7/2017 | Stojkovic et al. | |
| 9,789,937 B1 | 10/2017 | Ratigan | |
| 10,221,918 B2 | 3/2019 | Simonson et al. | |
| 10,335,616 B2 | 7/2019 | Ogura | |
| 2004/0146361 A1 | 7/2004 | Hau | |
| 2005/0241117 A1 | 11/2005 | Skyba | |
| 2006/0042151 A1 | 3/2006 | Kavanaugh | |
| 2006/0173330 A1 | 8/2006 | Kim | |
| 2007/0137003 A1 | 6/2007 | Zebe | |
| 2007/0205048 A1 | 9/2007 | Klingler | |
| 2010/0205784 A1 | 8/2010 | Yang | |
| 2012/0180267 A1 * | 7/2012 | LeBeau | F16G 11/143 |
| | | | 24/134 R |
| 2012/0311824 A1 * | 12/2012 | Mulholland | F16G 11/106 |
| | | | 24/301 |
| 2013/0126272 A1 | 5/2013 | Remsen | |
| 2014/0007389 A1 * | 1/2014 | Leung | F16G 11/143 |
| | | | 24/68 CD |
| 2014/0182085 A1 | 7/2014 | Dodge | |
| 2015/0096838 A1 | 4/2015 | LeFebvre | |
| 2016/0287913 A1 | 10/2016 | Bell | |
| 2016/0377150 A1 | 12/2016 | Simonson et al. | |
| 2017/0350089 A1 | 12/2017 | Hren et al. | |
| 2019/0093819 A1 | 3/2019 | Muller | |
| 2020/0253190 A1 | 8/2020 | D'Acquisto | |
| 2020/0297084 A1 | 9/2020 | Lai | |
| 2020/0347910 A1 | 11/2020 | Chih et al. | |
| 2020/0347911 A1 * | 11/2020 | Chih | F16G 11/105 |
| 2021/0078479 A1 * | 3/2021 | Lopez | F16G 11/106 |
| 2021/0330995 A1 | 10/2021 | Chu | |
| 2022/0017338 A1 | 1/2022 | Merritt et al. | |
| 2022/0023673 A1 | 1/2022 | Mauthner | |
| 2022/0241625 A1 | 8/2022 | Cowell et al. | |
| 2022/0403898 A1 | 12/2022 | Kils | |
| 2023/0038696 A1 | 2/2023 | Maurice et al. | |

* cited by examiner

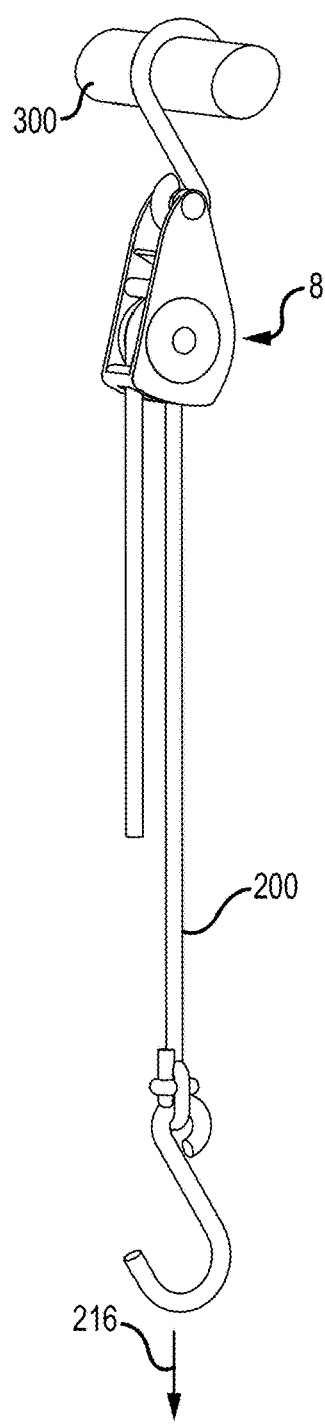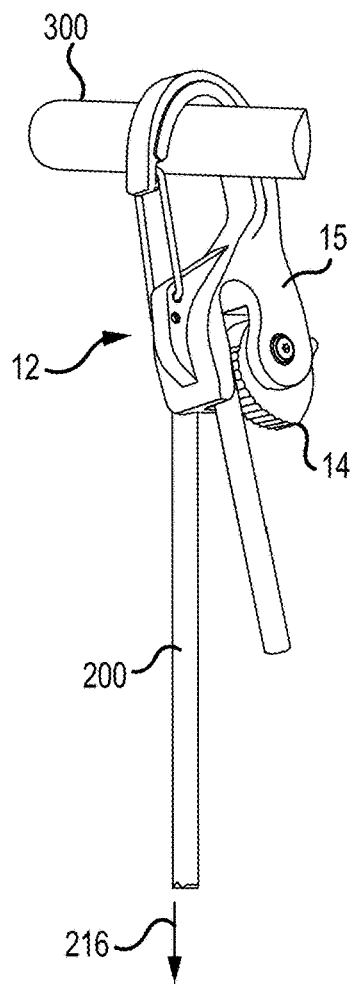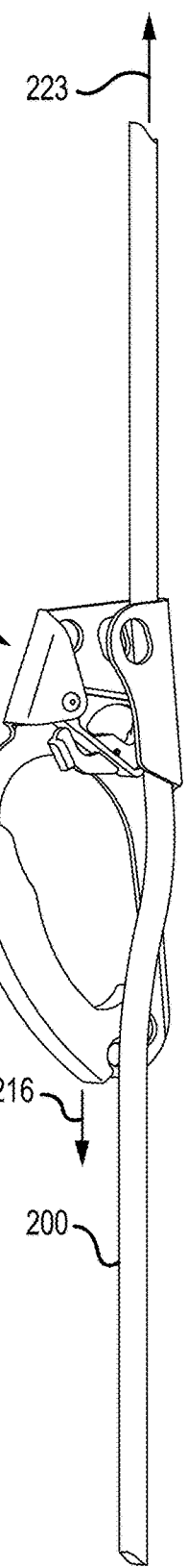
FIG.1 (Prior Art)
FIG.2 (Prior Art)
FIG.3 (Prior Art)

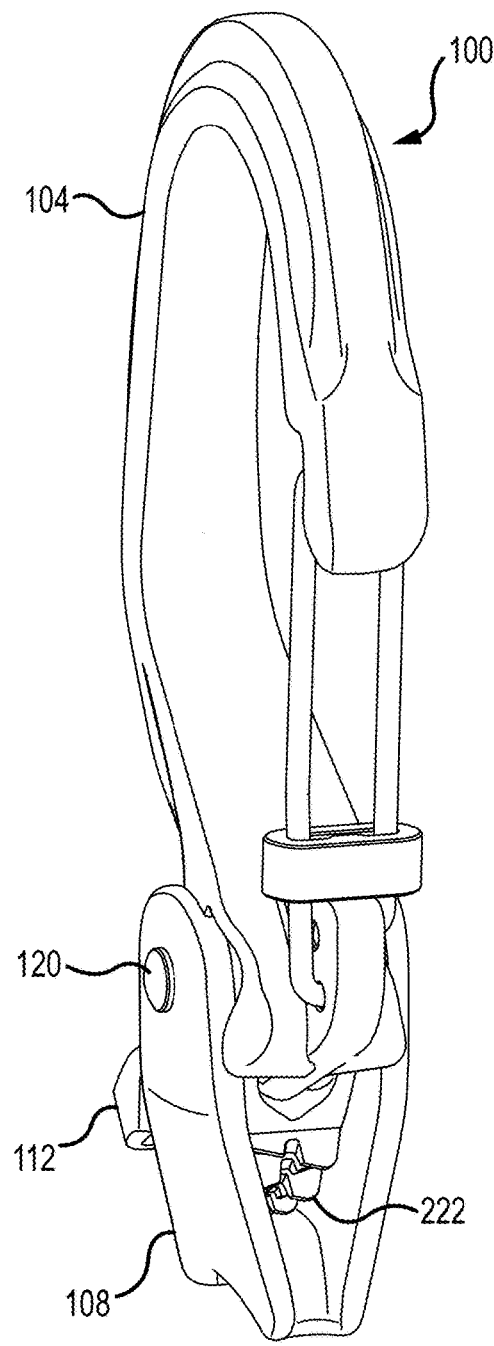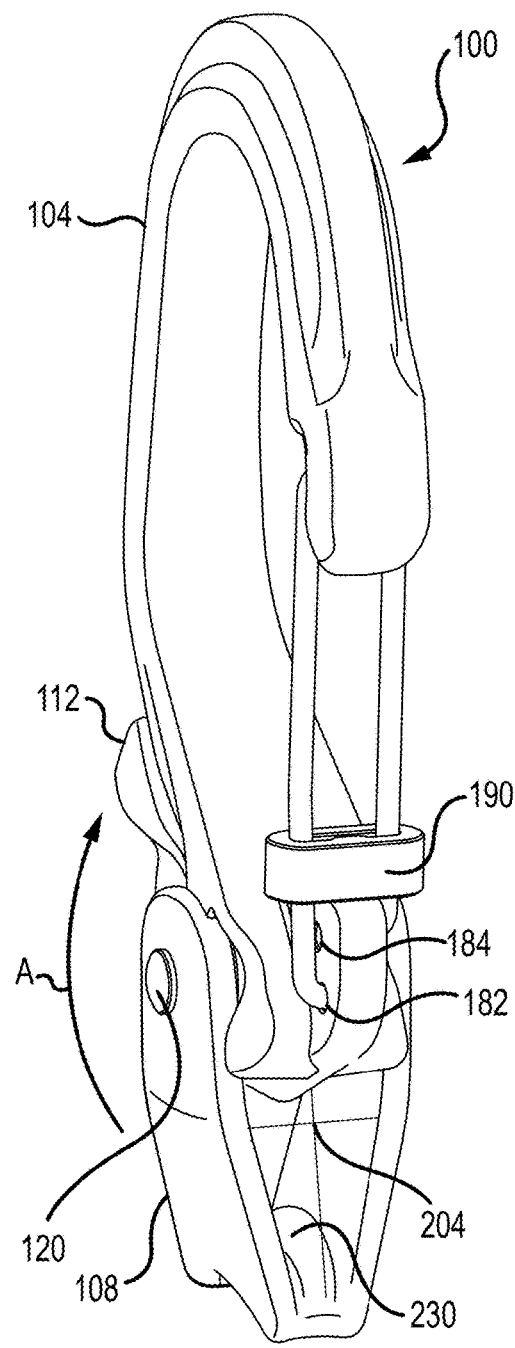
FIG.5a
FIG.5b

ROPE RESTRAINING AND SELECTIVE RELEASE DEVICE

This application claims the benefit of U.S. Provisional Patent Application Ser. No. 63/516,538, filed Jul. 31, 2023, the entire disclosure of which is incorporated by reference herein.

This application is related to U.S. Pat. No. 8,997,315, the entirety of which is incorporated by reference herein.

FIELD OF THE INVENTION

The Embodiments of the present invention described herein are devices configured to selectively receive a rope and secure the same. In some alternative configurations, the devices can function as a pulley before the rope is secured.

BACKGROUND OF THE INVENTION

In many situations, the ability to quickly and effectively attach the end of a rope to an object is advantageous. Ordinarily, a user must tie the rope to the object, which may require a knowledge of effective knots. In such a situation, the user may not be able to apply tension after tying the knot or release it easily. Further, knots rely on the friction and structure of the rope itself to hold securely, and they can be very reliable when tied correctly but require proper training and practice to ensure safety, which many users lack.

Accordingly, devices have been developed to bridge the gap between rope and object that omit the need for a knot, swage fitting, or other means that may not afford a secure interconnection. Some of these devices intend for the rope to remain permanently configured within or interconnected to the device, while others allow for selective rope removal. The means for rope retention also varies between device designs. A common boat cleat, for example, utilizes the tortuous path, wherein the rope is wrapped around or through physical constraints in the device to secure the rope, relying on friction between overlapping rope sections to hold the rope in place. Obviously, a knot in this sense is also a tortuous path retention scheme. The typical boat cleat is a static device, permanently attached to an anchor location with the intention that the rope to be secured is introduced to and subsequently removed from the device each time the device is utilized.

Another style of rope cleat relies more on a micro-tortuous path where the retention device physically deforms the rope. These rope retention devices are commonly referred to as jam cleats. As with the boat cleat, these styles of devices are intended to be permanently affixed to an anchor location. This style of device has multiple versions, varying from a ridged wedge-shaped channel to ridged rotating cam-shaped wheels that pinch the rope as the rope is drawn through the device.

FIG. 1 shows a common style of a rope retention device marketed by Carolina North Mfg. under the name Rope Ratchet 8 that utilizes a mechanical means to pinch the rope between two conical-shaped wheels. Rather than contacting the rope via a cam wheel perimeter, multi-faceted face surfaces of two opposing wheels bind the rope as the rope is drawn towards the central axis of the rotating wheels. This device utilizes ratcheting behavior to lock the wheels, thus preventing wheel rotation once the rope is bound between opposing wheel faces while the rope is under tension to, in effect, secure the rope. This style of device, while configurable as part of an initial setup, intends the rope to remain in the device between subsequent uses, thus utilizing the device/rope combination to adjust rope length between anchor points (anchor one being the location the device is secured to, anchor two being the location the auxiliary hook secured to the rope end extending from the device anchors to). As described, the rope can be introduced to and removed from this style of device. However, the process is typically cumbersome, so the best utilization of the device occurs when the rope remains in the device throughout subsequent uses. One consequence of this is the rope utilized with the device is typically tuned for the device, or vice-versa. This means the componentry that makes up the device is sized to accommodate a particular rope diameter. Additionally, this style of device utilizes a separate hook (or carabiner) rotatably secured to the device to serve as the connection means to the primary anchor location. The overall size of the device/hook combination (and the component count) can become quite large given the load rating and rope diameter the device is intended to support.

One upside to the independent rotatable hook provided by some existing systems is that loading applied to the rope will self-center the device/rope/hook along a single axis aligned along the length of the rope under tension. Accordingly, rope retention coupled with the rotatable hook will reduce the off-axis loading. One of ordinary skill in the art will appreciate that off-axis loading generally refers to situations where applied load is not aligned with the intended direction of force transmission. In other words, instead of a load being applied straight in line with the axis of the device (which is ideal), it is applied at an angle to this axis, which increases friction and wear and reduces efficiency. Further, off-axis loading can introduce safety risks, particularly in applications where precise control over loads and forces is crucial. The unpredictable forces and increased wear can lead to unexpected failures or accidents, especially in critical applications such as rescue operations or industrial lifting. Off-axis loading is often a common vulnerability in rope retention devices.

FIG. 2 shows another style of device marketed by Nite-Ize, Inc., under the brand name CamJam® XT 12 that incorporates a rotating cam-wheel 14 into a carabiner-style anchor attachment 15. Compared to the Rope Ratchet, the CamJam® XT has a smaller footprint per equivalent load rating. Additionally, given that the cam retention means is integrated with the hook, off-axis loading may be a vulnerable aspect of this design. Another aspect worth mentioning is that the open-channel jam-cleat style of rope retention could exacerbate off-axis load vulnerabilities.

By nature of the design, CamJam XT style and the Rope Ratchet style devices are intended to reside at one end of a rope configuration, commonly termed a fixed end configuration. Contrast this with devices used to ascend ropes where the device supporting a load travels along the rope rather than affixing the rope end to a specific anchor point. Rock climbing jumar/rope ascenders 16 are examples of this kind of rope device (see FIG. 3). Note that with rope ascenders, the loading force that binds the device to the rope must be removed before the device can be repositioned along the rope, which is the primary intent of the device design in that it allows movement of the device in one direction along the rope length by alternating directional load forces applied to the rope. In contrast, the aforementioned Rope Ratchet, the CamJam® XT, and similar devices can be utilized as static pulleys, where the rope is drawn through the device and back out of the device in the direction nearly opposite from which the rope entered the device.

By design, ascenders require the load force in the rope (or, more properly stated, the load force binding the device to the rope) to be initially removed from the rope before the device can either be repositioned along the rope or removed from the rope. The user is typically required to induce load forces greater in magnitude and in the opposite direction that binds a rope in the device to initiate rope removal. Both the Rope Ratchet and the CamJam® XT style of rope retention devices provide means to release rope tension binding the rope in the device without first having to reverse the direction of tension in the rope. However, the magnitude of the user releasable rope tension, as compared to the rated working load limit of the device, can easily differ by a factor of three or more, making the release of induced rope tension almost impossible for the user to execute, particularly so when rope tensions approach working load limits of the device. Thus, with higher working loads, the user must induce a load force in the rope greater in magnitude and in the opposite direction to enable rope release from the device. Boat cleats, at least in theory, enable a user to release tension from the rope by simply unbinding the rope from the tortuous rope path. However, if executed incorrectly, release of the rope from the boat cleat device can occur suddenly and result in injury. Additionally, if a user initially configures the rope incorrectly in the boat cleat style device, rope release while under tension may require cutting the rope.

When considering user interaction, device size, useable configurations, and rope selection, additional disadvantages arise that limit the overall effectiveness of the current art of rope tightening and securing devices.

SUMMARY OF THE INVENTION

It is one aspect of some embodiments of the present invention described herein to provide an improved rope restraining device configured to drastically reduce off-axis occurrences, configured to accept ropes of various sizes, and is easy to use. More specifically, one embodiment of the present invention comprises a hook, carabiner, eyelet, or other device adapted to selectively or permanently interconnect to an anchor that is operatively interconnected to a rope cradle. The rope cradle is configured to receive and support a rope under tension and also accommodates a cam lever biased towards a lower internal surface of the cradle. The device adapted to interconnect to anchor, cradle, and/or cam lever may employ hard stops that limit rotation, which helps prevent pinching and off-axis loading.

In operation, the cam lever is rotated away from the lower internal surface, thereby allowing the receipt of a rope. Release of the cam lever effectively secures the rope within the cradle and prevents its movement in a direction opposite to the direction of insertion, i.e., prevents pulling the rope from the rope cradle. Indeed, reversing tension further engages the cam lever against the rope, thereby increasing the securement force. In this fashion, the contemplated device functions as a one-way pulley. Complete release of the rope is achieved by rotating the cam lever in a direction opposite the lower internal surface of the cradle, thereby increasing the space between the cam lever and the lower internal surface and disengaging the cam lever from the rope.

Accordingly, the embodiments described herein selectively restrain a rope that avoid the disadvantages of current rope retention devices. Additionally, features incorporated in the embodiments described herein function as either a pulley style rope retention device or rope ascender style device. It is a further benefit that configuring the device described herein may only require intuitive action. Additionally, some embodiments benefit from having a proportionally small footprint compared to rated working load limits while avoiding off-axis loading and incorporating tension release capabilities that align with the device's working load limit.

The carabiners, or aspects of such, described in one or more of U.S. Pat. Nos. D626393, D934662, D934663, D942840, D943400, D935310, 10584736, D850241, D953147, D1035412, 11629749, D943400, D1024741, 11761473, D1024742, D1026625, and 11920627, which are incorporated by reference herein, may be utilized in some of the embodiments of the present inventions described herein.

Thus, it is one aspect of the present invention to provide a rope restraining device, comprising: a hook adapted for interconnection to an anchor; a cradle rotatably interconnected to the hook, the hook comprising a first side wall and a second side wall that are interconnected by a bottom wall, the first side wall and second side wall comprising a taper near the bottom wall, wherein: the bottom wall in a lateral direction between the first side wall and the second side wall has a cylindrical profile defined by a linear cross section, and the bottom wall is an axial direction extending from a proximal end of the cradle to a distal end of the cradle has an arcuate profile relative that extends from a bottom surface of the cradle, wherein the arcuate profile relative to the bottom surface, and wherein portions of the first side wall and the second side wall bound the arcuate profile; a cam lever positioned within the cradle and configured to rotate relative to the cradle, the cam lever having a grip geometry comprised of a plurality of teeth that faces the arcuate profile, the grip geometry having a first lateral width at a proximal end that and a second lateral width at a distal end that is less than the width of the first lateral width; wherein the distal end of the cam lever is biased toward the distal end of the cradle; and wherein rotation of the cam lever separating the distal end of the cam lever from the distal end of the cradle creates an opening between the grip geometry and the bottom wall of the cradle that is adapted to receive ropes of more than one diameter; and wherein rotation of the cam lever in an operation of the distal end of the cam lever toward the distal end of the cradle decreases the size of the opening, and prevents withdrawal of the rope from the cradle in a direction that generally corresponds with the proximal end of the cradle.

It is another aspect of some embodiments to provide a rope restraining device, comprising: a hook adapted for interconnection to an anchor; a cradle rotatably interconnected to the hook, the hook comprising a first side wall and a second side wall that are interconnected by a bottom wall, the first side wall and second side wall comprising a taper near the bottom wall, wherein: the bottom wall in a lateral direction between the first side wall and the second side wall has a cylindrical profile defined by a linear cross section, and the bottom wall is an axial direction extending from a proximal end of the cradle to a distal end of the cradle has an arcuate profile relative that extends from a bottom surface of the cradle, wherein the arcuate profile relative to the bottom surface, and wherein portions of the first side wall and the second side wall bound the arcuate profile; a cam lever positioned within the cradle and configured to rotate relative to the cradle, the cam lever having a grip geometry comprised of a plurality of teeth that faces the arcuate profile, the grip geometry having a first lateral width at a proximal end that and a second lateral width at a distal end that is less than the width of the first lateral width; wherein the distal end of the cam lever is biased toward the distal end of the cradle; and wherein rotation of the cam lever separating the distal end of the cam lever from the distal end of the cradle creates an opening between the grip geometry and the bottom wall of the cradle that is adapted to receive ropes of more than one diameter; wherein rotation of the cam lever in an operation of the distal end of the cam lever toward the distal end of the cradle decreases the size of the opening, and prevents withdrawal of the rope from the cradle in a direction that generally corresponds with the proximal end of the cradle; and wherein the cam lever has proximal hard stops and distal hard stops that cooperate with corresponding proximal hard stops and distal hard stops on the hook that limit cam lever rotation, and wherein the first side wall and second side wall of the cradle have notches that receive portions of the hook that limit cradle rotation.

It is another aspect of some embodiments to provide a rope restraining device, comprising: a hook adapted for interconnection to an anchor; a cradle rotatably interconnected to the hook, the hook comprising a first side wall and a second side wall that are interconnected by a bottom wall, the first side wall and second side wall comprising a taper near the bottom wall, wherein: the bottom wall in a lateral direction between the first side wall and the second side wall has a cylindrical profile defined by a linear cross section, and the bottom wall is an axial direction extending from a proximal end of the cradle to a distal end of the cradle has an arcuate profile relative that extends from a bottom surface of the cradle, wherein the arcuate profile relative to the bottom surface, and wherein portions of the first side wall and the second side wall bound the arcuate profile; a cam lever positioned within the cradle and configured to rotate relative to the cradle, the cam lever having a grip geometry comprised of a plurality of teeth that faces the arcuate profile, the grip geometry having a first lateral width at a proximal end that and a second lateral width at a distal end that is less than the width of the first lateral width; wherein the distal end of the cam lever is biased toward the distal end of the cradle; and wherein rotation of the cam lever separating the distal end of the cam lever from the distal end of the cradle creates an opening between the grip geometry and the bottom wall of the cradle that is adapted to receive ropes of more than one diameter; wherein rotation of the cam lever in an operation of the distal end of the cam lever toward the distal end of the cradle decreases the size of the opening, and prevents withdrawal of the rope from the cradle in a direction that generally corresponds with the proximal end of the cradle; wherein the cam lever has proximal hard stops and distal hard stops that cooperate with corresponding proximal hard stops and distal hard stops on the hook that limit cam lever rotation, and wherein the first side wall and second side wall of the cradle have notches that receive portions of the hook that limit cradle rotation; and wherein the cam lever and cradle have different rotation limits.

It is yet another aspect of some embodiments to provide a rope restraining device, comprising: a hook adapted for interconnection to an anchor; a cradle rotatably interconnected to the hook, the hook comprising a first side wall and a second side wall that are interconnected by a bottom wall, the first side wall and second side wall comprising a taper near the bottom wall, wherein: the bottom wall in a lateral direction between the first side wall and the second side wall has a cylindrical profile defined by a linear cross section, and the bottom wall is an axial direction extending from a proximal end of the cradle to a distal end of the cradle has an arcuate profile relative that extends from a bottom surface of the cradle, wherein the arcuate profile relative to the bottom surface, and wherein portions of the first side wall and the second side wall bound the arcuate profile; a cam lever positioned within the cradle and configured to rotate relative to the cradle, the cam lever having a grip geometry comprised of a plurality of teeth that faces the arcuate profile, the grip geometry having a first lateral width at a proximal end that and a second lateral width at a distal end that is less than the width of the first lateral width; wherein the distal end of the cam lever is biased toward the distal end of the cradle; and wherein rotation of the cam lever separating the distal end of the cam lever from the distal end of the cradle creates an opening between the grip geometry and the bottom wall of the cradle that is adapted to receive ropes of more than one diameter; wherein rotation of the cam lever in an operation of the distal end of the cam lever toward the distal end of the cradle decreases the size of the opening, and prevents withdrawal of the rope from the cradle in a direction that generally corresponds with the proximal end of the cradle; and wherein the cam lever and cradle are rotatably interconnected to the hook by a pivot pin, wherein rope tension will impart rotation of the cradle and/or cam lever relative to the hook, and wherein the relative rotation of the cradle and the cam lever align a force vector associated with the rope tension with the pivot pin and a centroid of the hook to reduce off-axis loading of the device.

It is another aspect of some embodiments to provide a rope restraining device, comprising: a hook adapted for interconnection to an anchor; a cradle rotatably interconnected to the hook, the hook comprising a first side wall and a second side wall that are interconnected by a bottom wall, the first side wall and second side wall comprising a taper near the bottom wall, wherein: the bottom wall in a lateral direction between the first side wall and the second side wall has a cylindrical profile defined by a linear cross section, and the bottom wall is an axial direction extending from a proximal end of the cradle to a distal end of the cradle has an arcuate profile relative that extends from a bottom surface of the cradle, wherein the arcuate profile relative to the bottom surface, and wherein portions of the first side wall and the second side wall bound the arcuate profile; a cam lever positioned within the cradle and configured to rotate relative to the cradle, the cam lever having a grip geometry comprised of a plurality of teeth that faces the arcuate profile, the grip geometry having a first lateral width at a proximal end that and a second lateral width at a distal end that is less than the width of the first lateral width; wherein the distal end of the cam lever is biased toward the distal end of the cradle; and wherein rotation of the cam lever separating the distal end of the cam lever from the distal end of the cradle creates an opening between the grip geometry and the bottom wall of the cradle that is adapted to receive ropes of more than one diameter; wherein rotation of the cam lever in an operation of the distal end of the cam lever toward the distal end of the cradle decreases the size of the opening, and prevents withdrawal of the rope from the cradle in a direction that generally corresponds with the proximal end of the cradle; and wherein the grip geometry possesses a groove extending from the proximal end to the distal end.

It is still yet another aspect of some embodiments to provide a rope restraining device, comprising: a hook adapted for interconnection to an anchor; a cradle rotatably interconnected to the hook, the hook comprising a first side wall and a second side wall that are interconnected by a bottom wall, the first side wall and second side wall comprising a taper near the bottom wall, wherein: the bottom wall in a lateral direction between the first side wall and the second side wall has a cylindrical profile defined by a linear cross section, and the bottom wall is an axial direction extending from a proximal end of the cradle to a distal end of the cradle has an arcuate profile relative that extends from a bottom surface of the cradle, wherein the arcuate profile relative to the bottom surface, and wherein portions of the first side wall and the second side wall bound the arcuate profile; a cam lever positioned within the cradle and configured to rotate relative to the cradle, the cam lever having a grip geometry comprised of a plurality of teeth that faces the arcuate profile, the grip geometry having a first lateral width at a proximal end that and a second lateral width at a distal end that is less than the width of the first lateral width; wherein the distal end of the cam lever is biased toward the distal end of the cradle; and wherein rotation of the cam lever separating the distal end of the cam lever from the distal end of the cradle creates an opening between the grip geometry and the bottom wall of the cradle that is adapted to receive ropes of more than one diameter; wherein rotation of the cam lever in an operation of the distal end of the cam lever toward the distal end of the cradle decreases the size of the opening, and prevents withdrawal of the rope from the cradle in a direction that generally corresponds with the proximal end of the cradle; and wherein the plurality of teeth are defined by structures with a short lateral edge and a long lateral edge with a groove therebetween, and wherein the short lateral edge and long lateral edge alternate from one tooth to the next.

It is another aspect of some embodiments of the present invention to provide a rope tension device, comprising: a cradle including a first side wall and a second side wall with a bracing structure extending between the first side wall and the second side wall, the cradle defining cylindrical surface with a cross section having a substantially literal portion extending from the first side wall and the second side wall; and a brake member pivotably coupled to the cradle, the brake member having a brake surface biased toward the cylindrical surface, the brake surface defining a plurality of teeth that face the cylindrical surface of the cradle; and wherein a gap is provided between the cylindrical surface and the plurality of teeth that varies in height along a lateral width of the cradle that extends between the first side wall and the second side wall.

It is yet another aspect of some embodiments of the present invention to provide a rope tension device, comprising: a cradle including a first side wall and a second side wall with a bracing structure extending between the first side wall and the second side wall, the cradle defining cylindrical surface with a cross section having a substantially literal portion extending from the first side wall and the second side wall; and a brake member pivotably coupled to the cradle, the brake member having a brake surface biased toward the cylindrical surface, the brake surface defining a plurality of teeth that face the cylindrical surface of the cradle; wherein a gap is provided between the cylindrical surface and the plurality of teeth that varies in height along a lateral width of the cradle that extends between the first side wall and the second side wall; and wherein the brake member has proximal hard stops and distal hard stops that limit cam lever rotation, and wherein the first side wall and second side wall of the cradle have notches limit cradle rotation.

It is yet another aspect of some embodiments of the present invention to provide a rope tension device, comprising: a cradle including a first side wall and a second side wall with a bracing structure extending between the first side wall and the second side wall, the cradle defining cylindrical surface with a cross section having a substantially literal portion extending from the first side wall and the second side wall; and a brake member pivotably coupled to the cradle, the brake member having a brake surface biased toward the cylindrical surface, the brake surface defining a plurality of teeth that face the cylindrical surface of the cradle; wherein a gap is provided between the cylindrical surface and the plurality of teeth that varies in height along a lateral width of the cradle that extends between the first side wall and the second side wall; wherein the brake member has proximal hard stops and distal hard stops that limit cam lever rotation, and wherein the first side wall and second side wall of the cradle have notches limit cradle rotation; and wherein the cam lever and cradle have different rotation limits.

It is yet another aspect of some embodiments of the present invention to provide a rope tension device, comprising: a cradle including a first side wall and a second side wall with a bracing structure extending between the first side wall and the second side wall, the cradle defining cylindrical surface with a cross section having a substantially literal portion extending from the first side wall and the second side wall; and a brake member pivotably coupled to the cradle, the brake member having a brake surface biased toward the cylindrical surface, the brake surface defining a plurality of teeth that face the cylindrical surface of the cradle; wherein a gap is provided between the cylindrical surface and the plurality of teeth that varies in height along a lateral width of the cradle that extends between the first side wall and the second side wall; and wherein the brake member and cradle are rotatably interconnected to a hook or loop by a pivot pin, wherein rope tension will impart rotation of the cradle and/or brake member relative to the hook or loop, and wherein the relative rotation of the cradle and the brake member align a force vector associated with the rope tension with the pivot pin and a centroid of the hook or loop to reduce off-axis loading of the device.

It is yet another aspect of some embodiments of the present invention to provide a rope tension device, comprising: a cradle including a first side wall and a second side wall with a bracing structure extending between the first side wall and the second side wall, the cradle defining cylindrical surface with a cross section having a substantially literal portion extending from the first side wall and the second side wall; and a brake member pivotably coupled to the cradle, the brake member having a brake surface biased toward the cylindrical surface, the brake surface defining a plurality of teeth that face the cylindrical surface of the cradle; wherein a gap is provided between the cylindrical surface and the plurality of teeth that varies in height along a lateral width of the cradle that extends between the first side wall and the second side wall; and wherein the brake surface possesses a groove.

It is yet another aspect of some embodiments of the present invention to provide a rope tension device, comprising: a cradle including a first side wall and a second side wall with a bracing structure extending between the first side wall and the second side wall, the cradle defining cylindrical surface with a cross section having a substantially literal portion extending from the first side wall and the second side wall; and a brake member pivotably coupled to the cradle, the brake member having a brake surface biased toward the cylindrical surface, the brake surface defining a plurality of teeth that face the cylindrical surface of the cradle; wherein a gap is provided between the cylindrical surface and the plurality of teeth that varies in height along a lateral width of the cradle that extends between the first side wall and the second side wall; and wherein the plurality of teeth are defined by structures with a short lateral edge and a long lateral edge with a groove therebetween, and wherein the short lateral edge and long lateral edge alternate from one tooth to the next.

It is still yet some embodiments of the present invention to provide a method of counteracting rope tension, comprising: providing a rope tension device, comprising: a cradle including a first side wall and a second side wall with a bottom wall extending between the first side wall and the second side wall, the bottom wall defining cylindrical surface with a cross section having a substantially literal portion extending from the first side wall and the second side wall; and a cam lever pivotably coupled to the cradle, the cam lever having a grip geometry biased toward the cylindrical surface, the grip geometry defining a plurality of teeth that face the cylindrical surface of the cradle; applying pressure to the cam lever to rotate of the cam lever and separate a distal end of the cam lever from a distal end of the cradle to create or expand an opening between the grip geometry and the bottom wall of the cradle; inserting one end of a rope into the opening; pulling a length of rope through the cradle; releasing the cam lever, thereby allowing the cam lever to rotate towards a proximal end of the device, to decrease the size of the opening, and to squeeze the rope between the cam lever the bottom wall of the cradle; and wherein withdrawal of the rope from the cradle in a direction that generally corresponds with the proximal end of the cradle is prevented, but movement of the rope through the cradle is possible.

It is still yet some embodiments of the present invention to provide a method of counteracting rope tension, comprising: providing a rope tension device, comprising: a cradle including a first side wall and a second side wall with a bottom wall extending between the first side wall and the second side wall, the bottom wall defining cylindrical surface with a cross section having a substantially literal portion extending from the first side wall and the second side wall; and a cam lever pivotably coupled to the cradle, the cam lever having a grip geometry biased toward the cylindrical surface, the grip geometry defining a plurality of teeth that face the cylindrical surface of the cradle; applying pressure to the cam lever to rotate of the cam lever and separate a distal end of the cam lever from a distal end of the cradle to create or expand an opening between the grip geometry and the bottom wall of the cradle; inserting one end of a rope into the opening; pulling a length of rope through the cradle; releasing the cam lever, thereby allowing the cam lever to rotate towards a proximal end of the device, to decrease the size of the opening, and to squeeze the rope between the cam lever the bottom wall of the cradle; wherein withdrawal of the rope from the cradle in a direction that generally corresponds with the proximal end of the cradle is prevented, but movement of the rope through the cradle is possible; and wherein the cam lever and cradle are rotatably interconnected to a hook or loop by a pivot pin, wherein rope tension will impart rotation of the cradle and/or cam lever relative to the hook or loop, and wherein the relative rotation of the cradle and the cam lever align a force vector associated with the rope tension with the pivot pin and a centroid of the hook or loop to reduce off-axis loading of the device.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and, together with the general description of the invention given above and the detailed description of the drawings given below, serve to explain the principles of these inventions.

FIG. 1 shows one version of a rope tightening device.

FIG. 2 shows one version of a prior art rope tightening device.

FIG. 3 shows a version of a rope ascender.

FIG. 5a shows a perspective view of the device shown in FIG. 4.

FIG. 5b is a perspective view similar to FIG. 5a, wherein a cam lever is rotated to an open position such that a rope cradle is configured to receive a rope.

FIG. 10b is a front elevation view of FIG. 10a.

FIG. 10c is a top perspective view of FIG. 10a.

FIG. 16b is an exploded view of the device shown in FIG. 16a.

Figure 4:
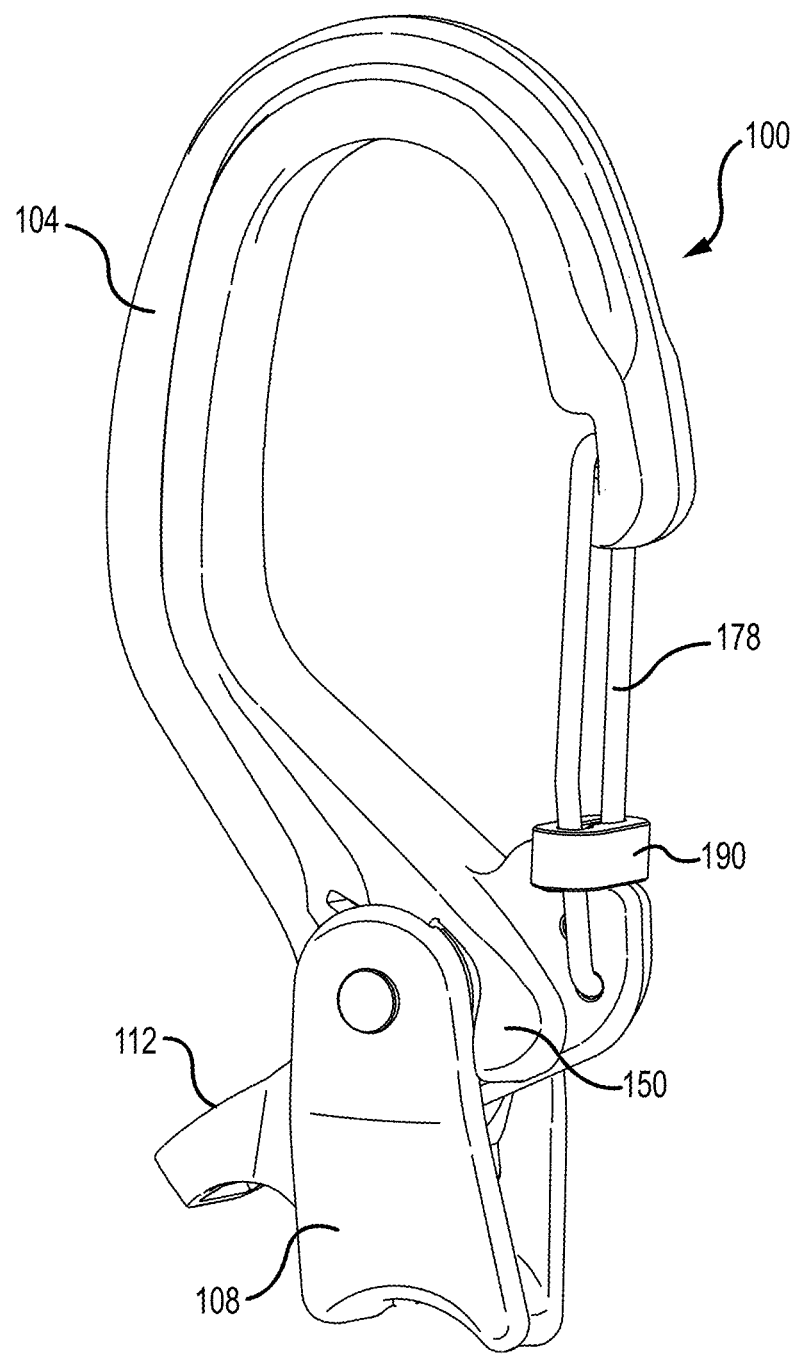
FIG. 4 is a perspective view of a rope restricting and selective release device of one embodiment of the present invention.
Figure 6:
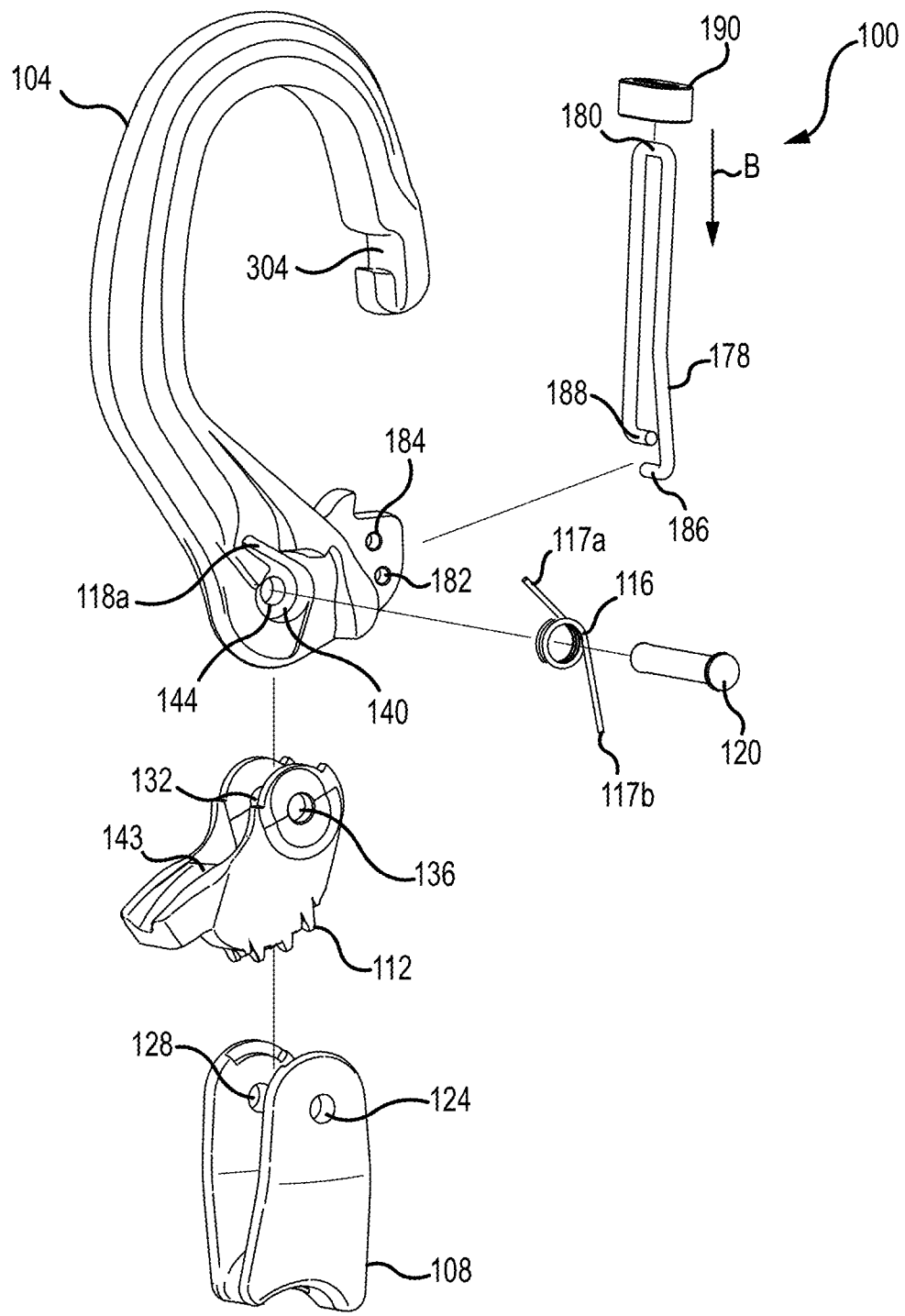
FIG. 6 is an exploded perspective view of the device shown in FIG. 4.

The following component list and associated numbering found in the drawings is provided to assist in the understanding of one embodiment of the present invention:

\# Component
8 Rope ratchet
12 CamJam®
14 Cam wheel
15 Carabiner
16 Rope ascender
100 Rope restraining and release device
104 Hook
108 Rope cradle
112 Cam lever
116 Torsion spring
117 Leg
118 Torsion spring hard stop
119 Thumb press
120 Pivot-pin
124 Opening
128 Opening
132 Opening
136 Opening
140 Cavity
144 Opening
150 Base
154 Rope cam hard stop
164 Rope cradle hard stop
174 Hook hard stop
176 Stabilizing surface
177 Notch
178 Spring gate
180 End
184 Mounting hole
186 Leg
188 Leg
190 Slide lock
194 Slide seat
200 Rope
204 Opening
210 Sidewall
214 Sidewall
215 Applied tension
216 Rope tension
218 Concave profile
222 Grip geometry
230 Bottom surface
234 Cam profile
300 Anchor
304 Cutout
308 screwdriver
312 Recess
320 Distal end
324 Proximal end
328 Lower interior sidewall
332 Lower interior sidewall
350 Linear alignment
354 Centroid
358 Void
400 Elastomeric rope
404 Slide
408 Endcap
500 Line
504 Anchor
508 Signage
600 Rope restraining and release device
602 Loop
700 Carabineer
704 Closed loop
708 Open loop It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 4-7c show a device for restraining and selectively releasing a rope 100 of one embodiment of the present invention that generally includes a hook 104, a rope cradle 108, and the cam lever 112, which is configured to move relative to the rope cradle 108 to selectively secure/release a captured rope. The hook 104 of one embodiment consists of an aluminum die-cast hook 104 operatively interconnected to an aluminum die-cast cam lever 112, an aluminum die-cast rope cradle 108, and a stainless-steel torsion spring 116 by means of a swaged metal pivot pin 120. The pivot pin 120 extends through openings 124, 128 in the rope cradle 108, through openings 132, 136 in the cam lever 112, through the coiled torsion spring 116 residing in a hook spring cavity 140, and finally through a hook opening 144. Once assembled, the pivot pin 120 is end-swaged, permanently securing the pivot pin 120, torsion spring 116, cam lever 112, and rope cradle 108 to the hook 104. One leg 117a of the torsion spring 116 presses against a recessed surface 118a in the hook 104, and another leg 117b of the torsion spring presses against a corresponding surface 118b near the base of the thumb tab 119 in the cam lever 112, biasing the cam lever 112 toward a closed position.

Figure 8A:
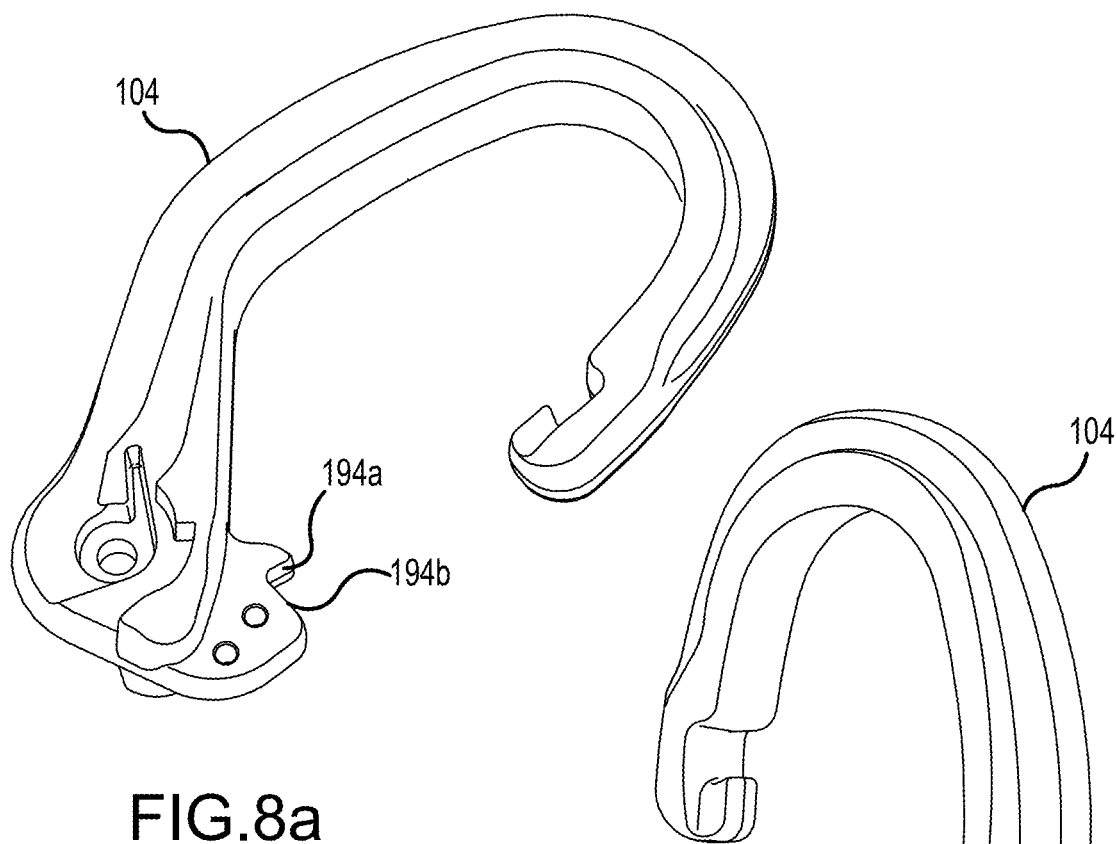
FIG. 8a is a perspective view of the hook body of the device shown in FIG. 4.
Figure 8B:
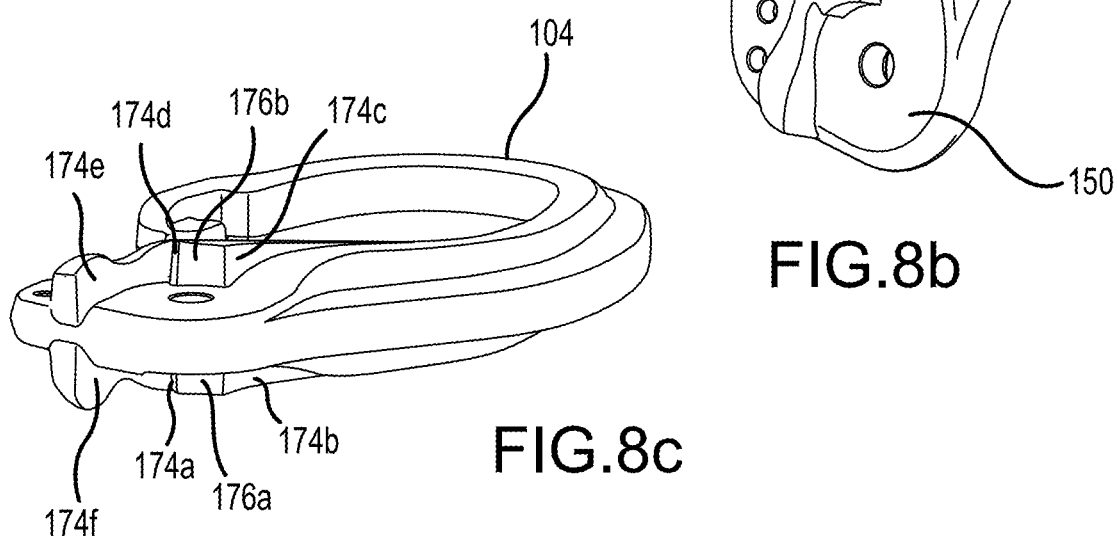
FIG. 8b is another perspective view of the hook body.
Figure 8C:
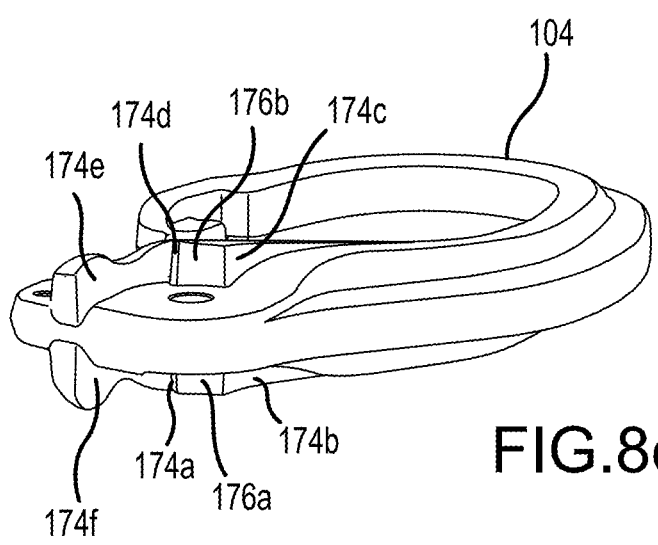
FIG. 8c is another perspective view of the hook body.
Figure 9A:
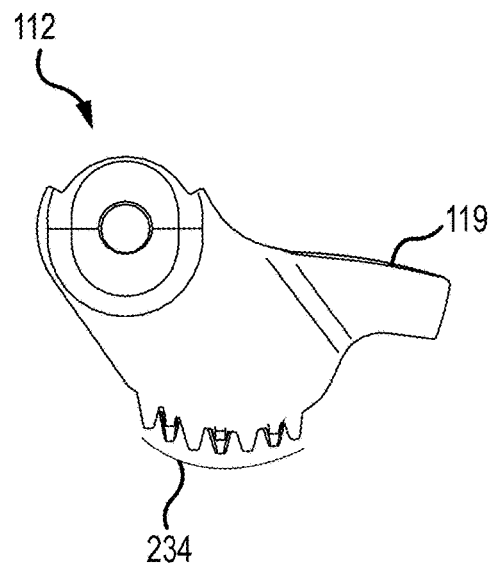
FIG. 9a is a side elevation view of the cam lever of the device shown in FIG. 4.
Figure 9B:
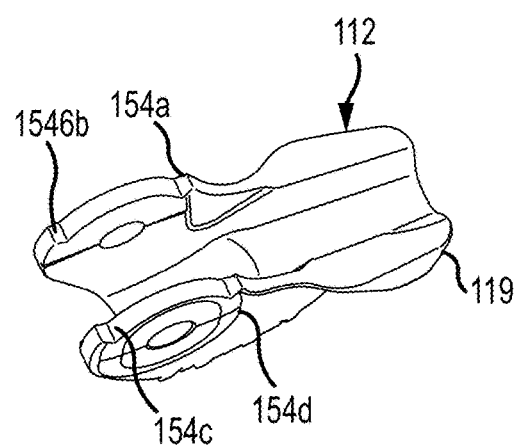
FIG. 9b is a perspective view of the cam lever.
Figure 10C:
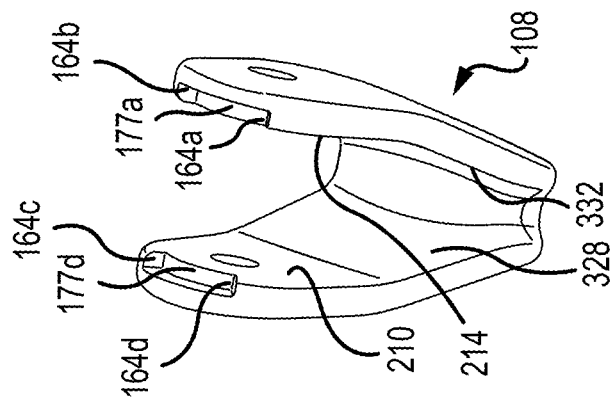

The cam lever 112 resides within inner sidewalls of the rope cradle 108, while a base portion of the hook 150 resides within the inner sidewalls of the of the cam lever 112. The cam lever 112 and the rope cradle 108 are free to rotate about the pivot pin 120 along Arrow A. The cam lever's rotation range is limited by cam lever rotation-stops 154a-154d (see, for example, FIG. 9b) in the cam lever, corresponding rotation-stops 164a-164b (see, for example, FIG. 10c) in the rope cradle, and rotation-stops 174a-174f integrated into the hook 104 (see, for example, FIG. 8c).

Some embodiments of the present invention employ a stainless-steel wire-form spring gate 178 operatively interconnected to the hook 104 by means of mounting holes 182, 184 that capture spring gate ends 186, 188. A slide lock 190 may be provided that slides onto the formed spring gate 178. The slide lock 190 can move toward a base portion of the spring gate along Arrow B until it engages surfaces 194a, 194b that define a seat near the spring gate mounting holes 182, 184. In this configuration, movement of the spring gate is restricted as shown, for example, in FIG. 7a. When the slide-lock 190 is moved from the bottom of the spring gate 178 towards the free end of the spring gate 180, the spring gate unlocks and is now free to rotate along Arrow C toward the hook 104. That is, when the slide-lock 190 is positioned near the bottom of the spring gate 178, in contact with the seat in the hook, the spring gate is prevented from rotating to an open position.

Figure 11A:
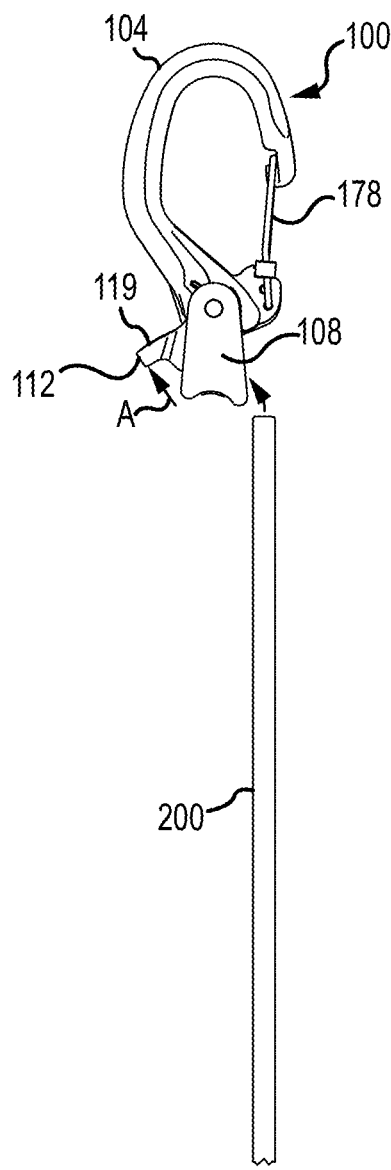
FIG. 11a is a side elevation view of the device of FIG. 4, wherein the cam lever is in a closed position.
Figure 11B:
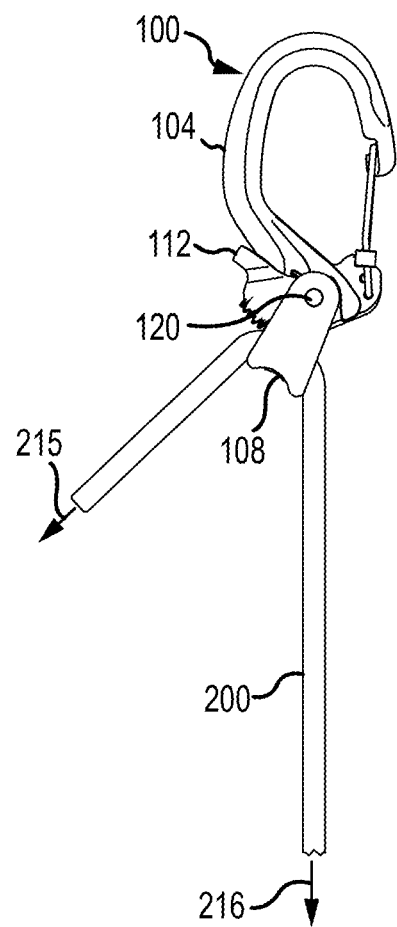
FIG. 11b is a side elevation view of the device of FIG. 4 with a rope inserted between the cam lever and the rope cradle.
Figures 11C, 11D:
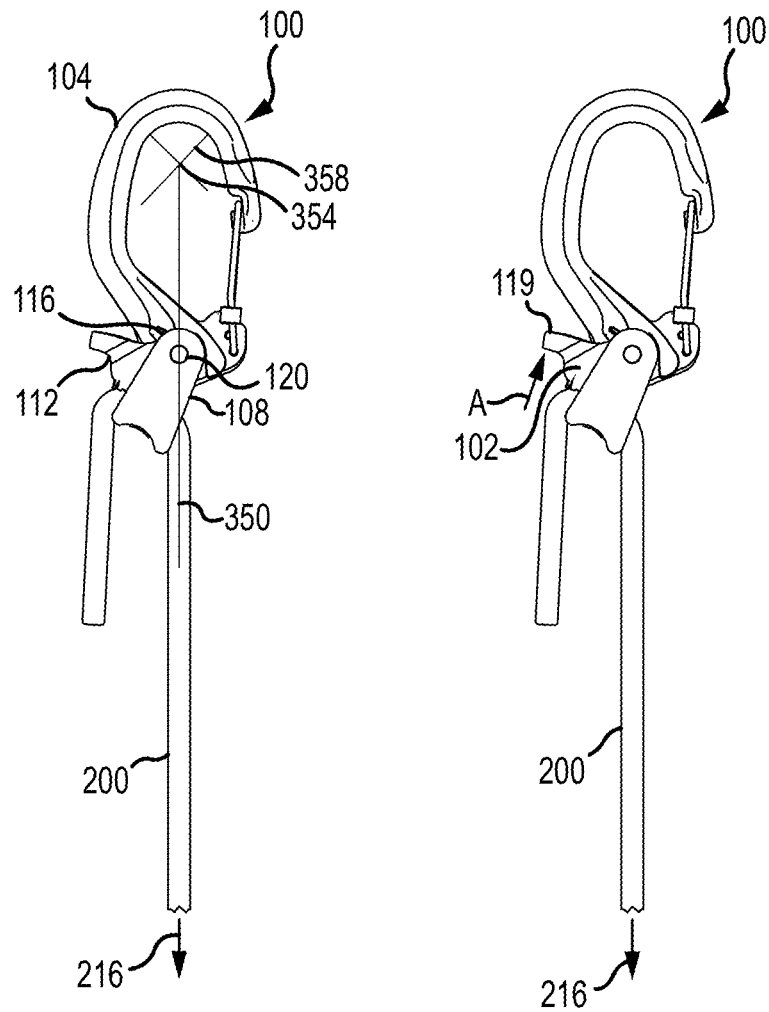
FIG. 11c shows a side elevation view showing the rope being restrained in a fixed position by the device of FIG. 4.
FIG. 11d is a side elevation view showing the rope restrained by the device shown in FIG. 4.
Figure 11E:
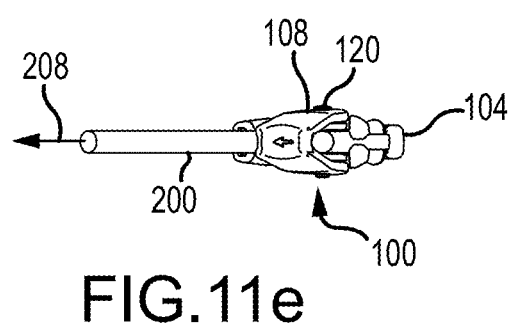
FIG. 11e is a bottom plan view of FIG. 11b.

FIGS. 11a-11e illustrate rope integration into the device 100. Again, Arrow A indicates the direction in which the cam lever 112 rotates to allow the insertion of a rope 200 into an opening 204 (see FIG. 5b), which is defined by the cam lever 112 and rope cradle 108. The opening 204 of one embodiment is defined by the rope cradle sidewalls 210, 214 and a concave profile 218 defined by the array of grip geometries 222 protruding from the cam lever 112. After initial insertion, the rope 200 is drawn through opening 204. Tension arrows 215, 216 indicate opposing directions of tensile forces competing to draw the rope further into the device or withdraw the rope 200. FIG. 11c shows the rope 200 restrained, wherein the rope 200 is aligned with the pivot pin 120 and a center of the hook 354. FIG. 11d illustrates how the rope can be released upon rotation of the cam lever 112 in the direction of Arrow A.

In the closed, device empty condition, shown in FIG. 11a, the torsion spring 116 biases the cam lever 112 toward the spring gate 178, thereby minimizing the opening 204. Rotation past a predetermined point is prevented by hook stops 174d, 174a, 174e, and 174f. The hook rotation stops 174 also prevent over-rotation of the rope cradle 108 when the rope experiences inordinately large tensions while the device is configured as a rope-ascender configuration. Stabilizing surfaces 176 on the hook limit wobble between the rope cradle 108 and cam lever 112 by serving as physical contact guides to the cutouts 177 of the rope cradle.

Pressing the thumb tab 119 on the cam lever 112 toward the hook 104 in the direction of Arrow A rotates the cam lever 112 about the pivot pin 120. Rotating the cam lever 112 will eventually engage cam lever rotation hard stops 154a, 154b against corresponding hook hard stops 174c, 174b and fully open the cam lever with respect to the rope cradle 108 and maximize the size of the opening 204, as shown in FIGS. 5b and 11b. With the cam lever 112 rotated to an open position, the rope 200 can be inserted into the hook void 358 opening 204. An arrow-shaped protrusion may be provided on the bottom exterior surface of the rope cradle 108 to indicate the proper direction of rope insertion.

Figure 7A:
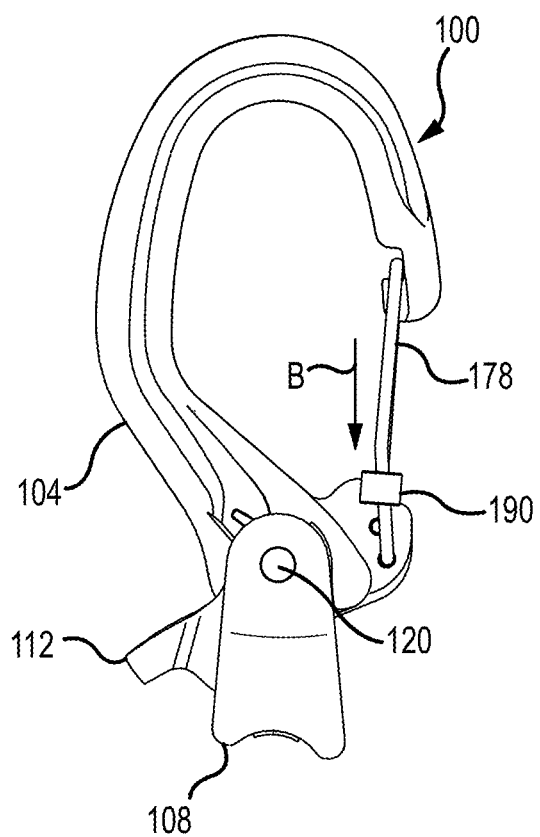
FIG. 7a is a side elevation view of the device of FIG. 4.
Figure 7B:
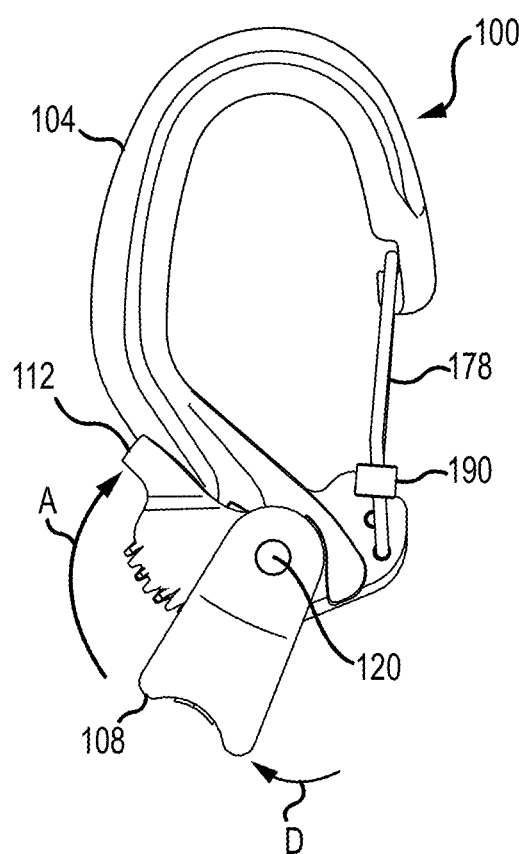
FIG. 7b is a side elevation view of the device of FIG. 4, wherein the cam lever is configured to receive a rope.
Figure 7C:
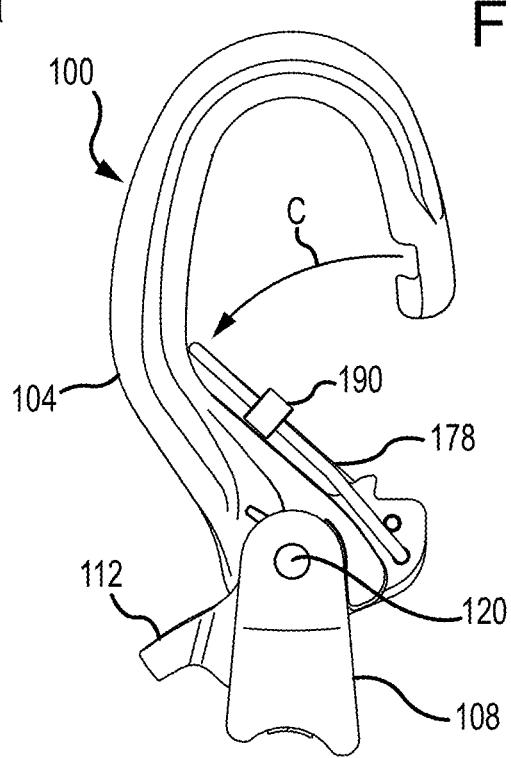
FIG. 7c is a side elevation view of the device, wherein a spring gate is in an open position.

Removal of the finger or thumb from the thumb tab 119 on the cam lever 112 allows the torsion spring 105 to relax, rotating the cam lever into the closed position with respect to the rope cradle 108, as illustrated in FIGS. 7c and 11c. At this point, the rope 200 is removably secured as the protruding grip geometries 222 presses the rope 200 against an inner saddle shaped surface 230 at the base of the rope cradle 108.

Tension 215 applied to the end of the constrained rope will tend to draw the rope through the device in the direction of the applied tension. However, rope tension 212 in the opposing direction will interact with the grip geometries, further rotating the rope cam deeper into the locked position and increasing lateral rope compression, which enhances device/rope engagement. Stated differently, the cam-shaped profile 234 of the cam lever 112, in conjunction with the cam lever grip geometries 222, will induce increasing pressure on the rope 200 as the cam lever continues to be drawn toward a closed position, which in turn increases the retention force holding the rope 200 within the device 100.

Figure 9C:
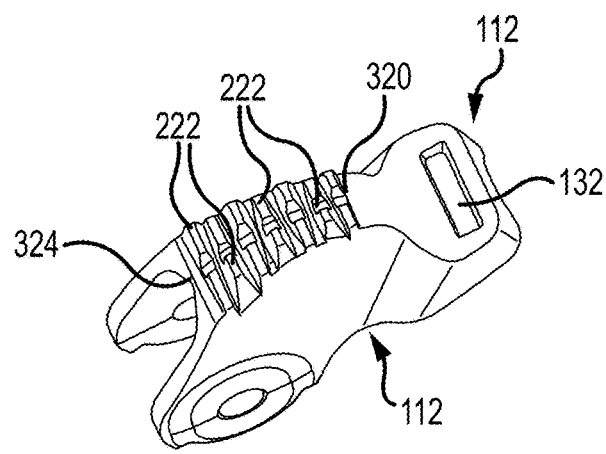
FIG. 9c is a perspective view of the cam lever.
Figure 9D:
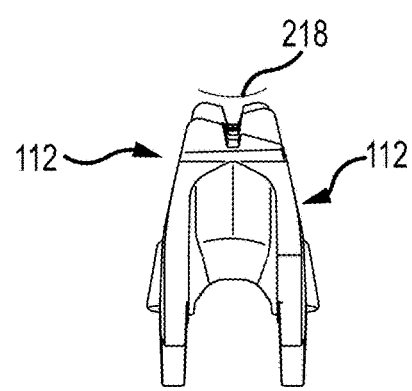
FIG. 9d is a left elevation view of FIG. 9c.
Figure 10B:
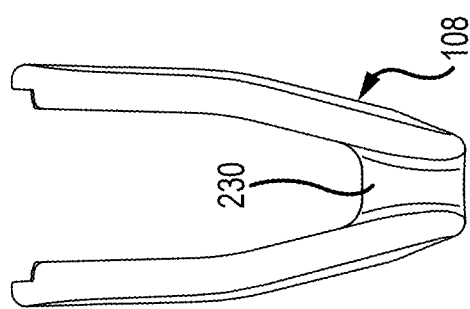
Figure 10A:
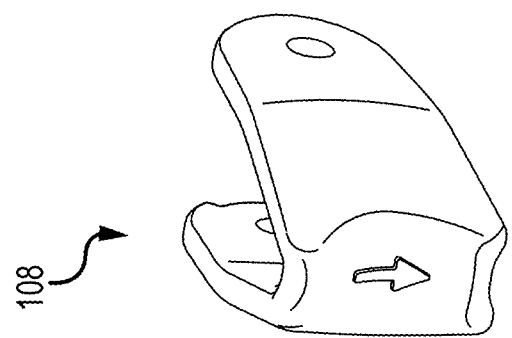
FIG. 10a is a bottom perspective view of a rope cradle of the device shown in FIG. 4.

FIGS. 9c and 10b show how interactions between the rope cam and rope cradle are enhanced. More specifically, the cam lever 112 possesses a taper, wherein a distal end of the grip geometry 320 is shorter than that of its proximal end 324. The coordinated tapering of the cam lever is configured to match the narrowing V-shape structure of the rope cradle as the cam lever rotates further into the space bounded by the rope cradle sidewalls 210, 214, 328, and 332. The coordinated tapering allows the device to accept a variety of rope sizes/types. Further, regardless of rope diameter/type restrained in the device, a full circumferential retention pressure is applied to the rope that will tend to distribute the rope-restraining contact forces to a larger area of the rope than is otherwise possible using prior art rope retention devices. Said contact forces are generated by means of the cam lever grip geometries 133 pressing the rope 200 into the inner saddle-shaped surface 230 of the rope cradle 108. A larger area of distributed rope retention force (contact force)

minimizes localized rope pressure and tends to increase the maximum load level that a rope can sustain before experiencing failure.

While this rope retention scheme employed by some embodiments of the present invention creates a similar retention dynamic provided by a jumar-type rope retention device 16 (see. FIG. 3), jumars are not designed to accommodate a wide range of rope diameters within a single device, nor are they suitable for use as a static pulley. More specifically, the embodiments described herein can accommodate a wide range of rope diameters and are suitable for use as static pulleys. Additionally, and unlike jumar-type devices, the specific shape of the protruding grip geometries 222 arrayed on the cam lever 112 minimize rope damaging contact interactions, which enables the rope 200 to be selectively released from the device 100 while the rope is constrained in the device remains under tension.

Because the rope cradle 108 can rotate about the pivot pin 120 while it is constrained in the hook 104, the tension 216 induced in the rope 200 will produce a linear alignment 225 between the tension 216, the pivot pin 120, and a centroid 354 of the void 358 defined by the hook, as shown in FIG. 11c. This aligning action 350 of the rope tension 216 by means of the rotating rope cradle 108, enables the device 100 to accommodate a wide variety of rope diameters without inducing off-axis forces in either the rope or the device, which can result in premature failure of the hook or the rope. Thus, the ability of the rope cradle 108 to rotate along Arrow D (FIG. 7b) through a limited rotation range minimizes off-axis strain on the rope 200 and the hook 104 whenever the rope is under tension 216.

The cam lever 112 and the rope cradle 108 are also free to rotate through specific rotation ranges about the pivot pin. The rotation range of the cam lever and the rotation range of the rope cradle are both controlled by the same hook hard stops 174a-174d. However, the complimentary rope cam hard stops 154a-154d in the cam lever 112 and rope cradle hard stops 164a-164d result in rotation ranges that differ for the two components. The presence of the rotation hard stops prevents the rope cradle 108 from rotating with the cam lever 112 through the entire rotation range available to the cam lever. This difference in rotation ranges creates the opening 204 into which a rope 200 is initially inserted when configuring a rope within the device.

The primary advantage to this means of rope insertion is that a simple, singular thumb or index finger action, pressing on the thumb tab 119 causes the cam lever to rotate, which is all that is required to prepare the device 100 for rope 200 insertion. Additionally, once a rope is inserted into the device, simply removing the thumb or index finger from the cam lever thumb tab will result in the rope being removably restrained in the device. This method for rope insertion and retention is arguably one of the simplest to execute when compared to various current art rope retention devices.

Conversely, applying sufficient force to the thumb tab 119 on the cam lever 112, in a direction that will result in the cam lever rotating away from the rope 200 held under tension in the device 100, will release the rope. Note that the singular thumb or index finger action described above, and the tension release action described here, are identical actions, thus making user operation of the device an extremely simple endeavor.

Figure 12:
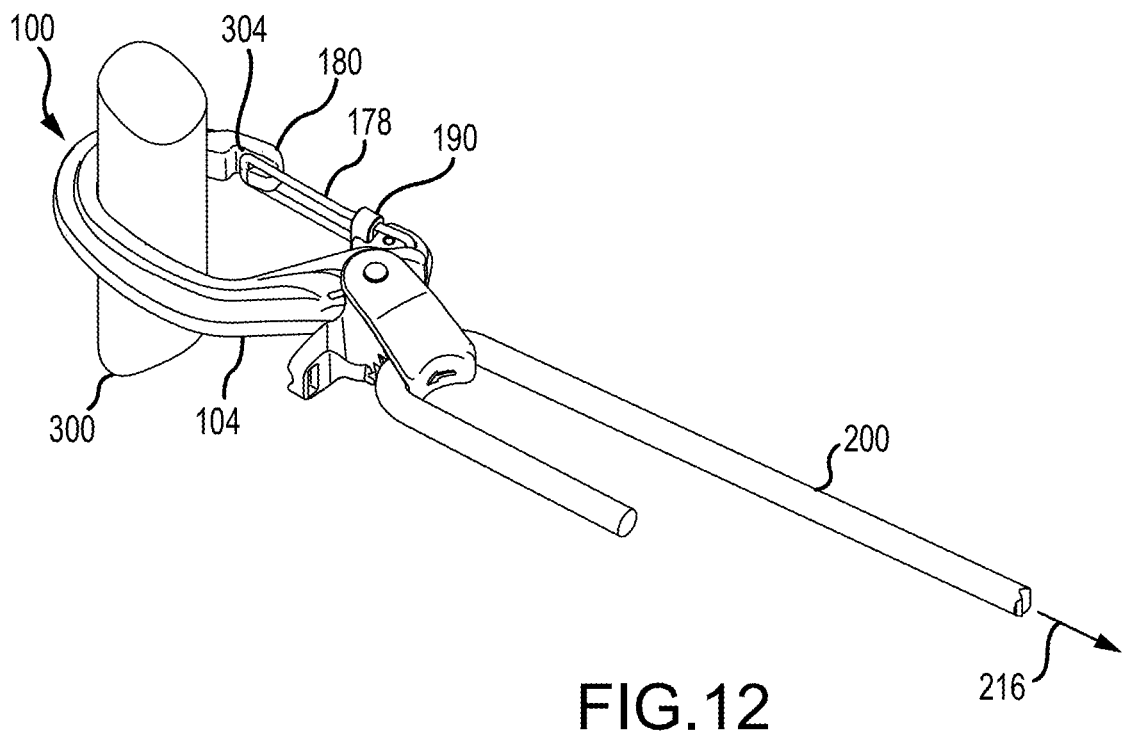
FIG. 12 shows the device of FIG. 4 secured to an anchor location and restraining a rope.
Figure 13:
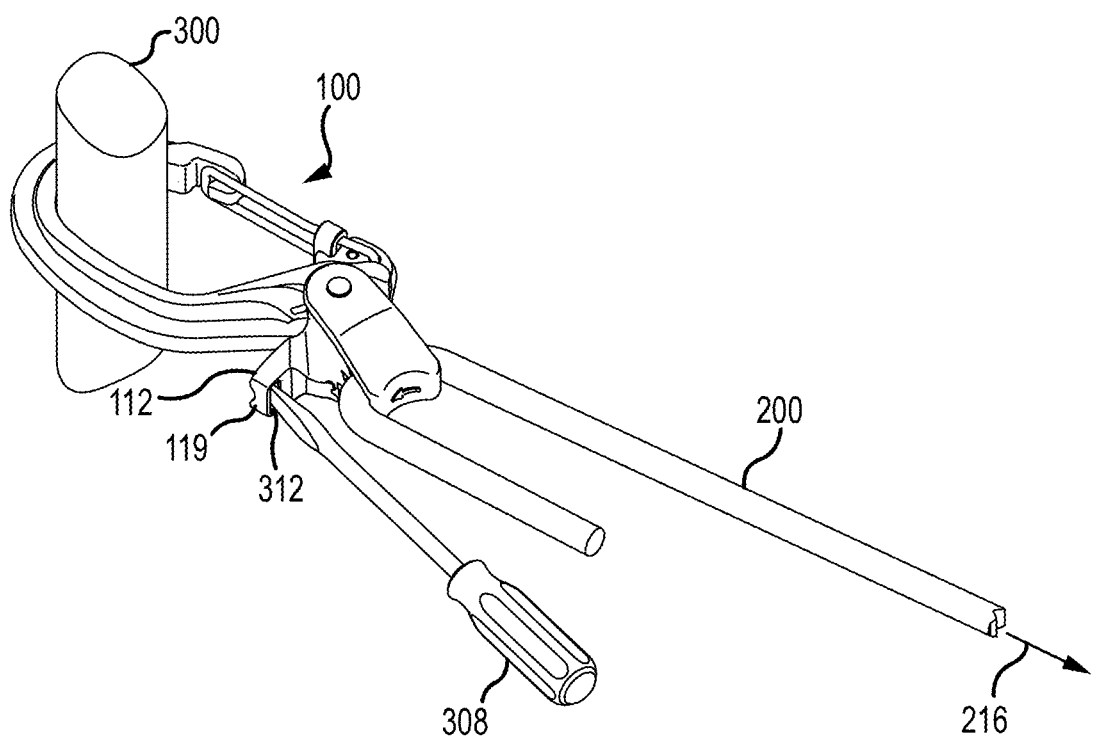
FIG. 13 shows the device of FIG. 4, wherein a tool is positioned in a recess on the underside of the cam lever.

As shown in FIGS. 12 and 13, the spring gate 178 may be rotated to an open position to allow the device 100 to be secured to anchors 300 of various types, e.g., pipes, ropes, wire loops, straps, etc. Once the device 100 is positioned on an anchor 300 of compatible size, the spring gate 178 rotates back to a closed position where the formed end 180 of the spring gate 178 contacts the cutout in the hook end 304, thereby securing the hook 104 to the anchor 300. When the optional slide-lock 190 is moved back to a locked position, inadvertent release of the device from an anchor is prevented. Moving the slide-lock 190 away from the locked position allows the spring gate 178 to rotate to an open position, thus allowing the device to be removed from the anchor to which its secured. Overly high induced rope tensions, perhaps resulting from an inadvertent load shift, can be released from the device using an auxiliary tool 308 that is positioned into the recess 312 on the underside of the thumb tab 119 of the cam lever 112 to transmit a percussive impact to the rope cam.

Figure 14:
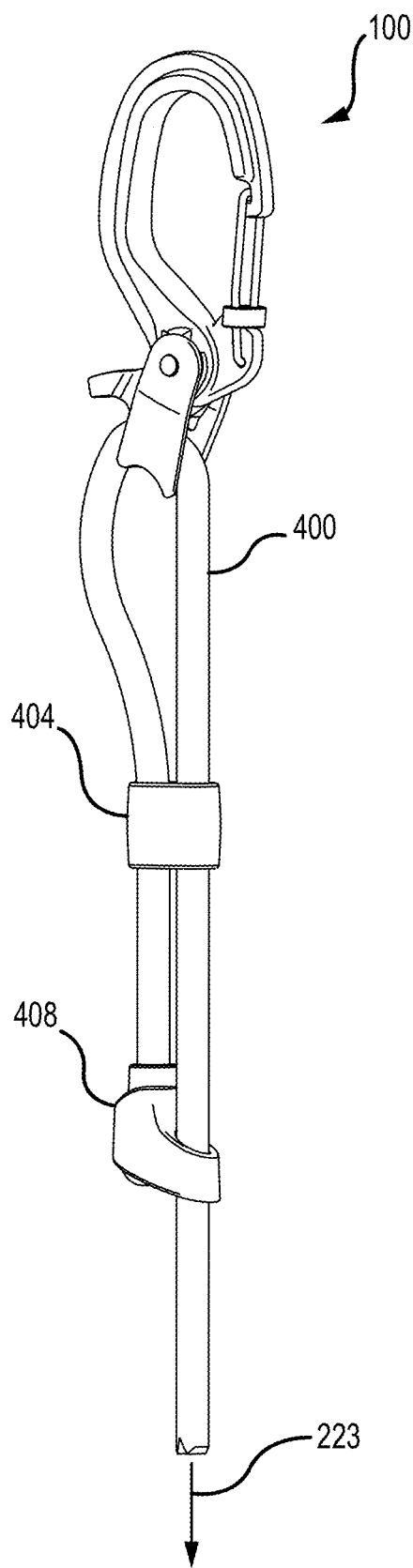
FIG. 14 shows the device of FIG. 4 restraining an elastomeric cord or rope in a fixed position.

FIG. 14 shows the device 100 from FIG. 4 in an adjustable fixed length configuration. Note, an elastomeric cord or rope 400, can be permanently constrained within the device 100 yet remain free to adjustably move through the device. A slide 404 and end cap 408 serve to dress and organize the elastomeric cord or rope. The end cap 408 also serves to secure the elastomeric cord or rope 400 in a loop that permanently binds the device 100 to the elastomeric cord or rope 400.

Figure 15:
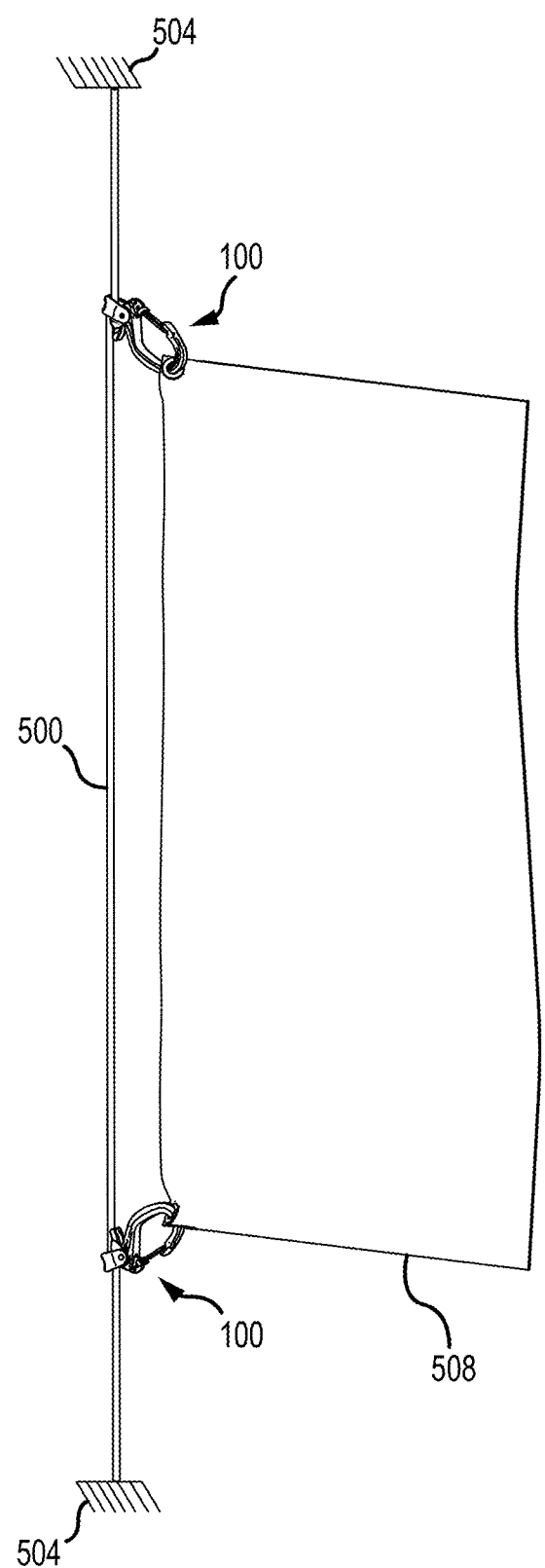
FIG. 15 shows two devices removably secured along a line.

FIG. 15 shows two devices 100 attached along a section of line 500 held taught at fixed anchor locations 504. Each device 100 remains positionally adjustable along the line 500. The locking nature of the device 100 prevents movement in one direction along the line while allowing movement in the other direction. Various combinations utilizing multiple units of the device 100 could be created. For example, as shown in FIG. 15, two embodiments are positioned in opposition to each other where flexible signage 508 is held taunt while hung from a fixed line. Another example would be adding multiple units of the device 100 along a single line to serve as a fish stringer, where the hook portion of a small version of the device would hook through the gills of the fish. As subsequent fish are caught, additional copies of the device could be removably added to the line currently securing the previously caught fish.

Figure 16A:
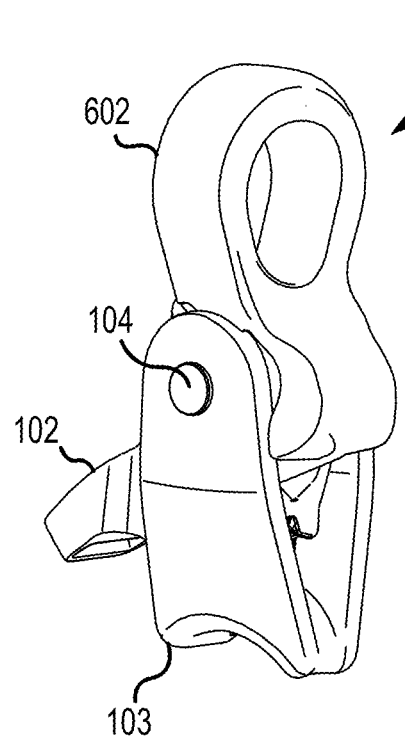
FIG. 16a is a perspective view of another embodiment of the present invention configured to interconnect to a carabiner.
Figure 16B:
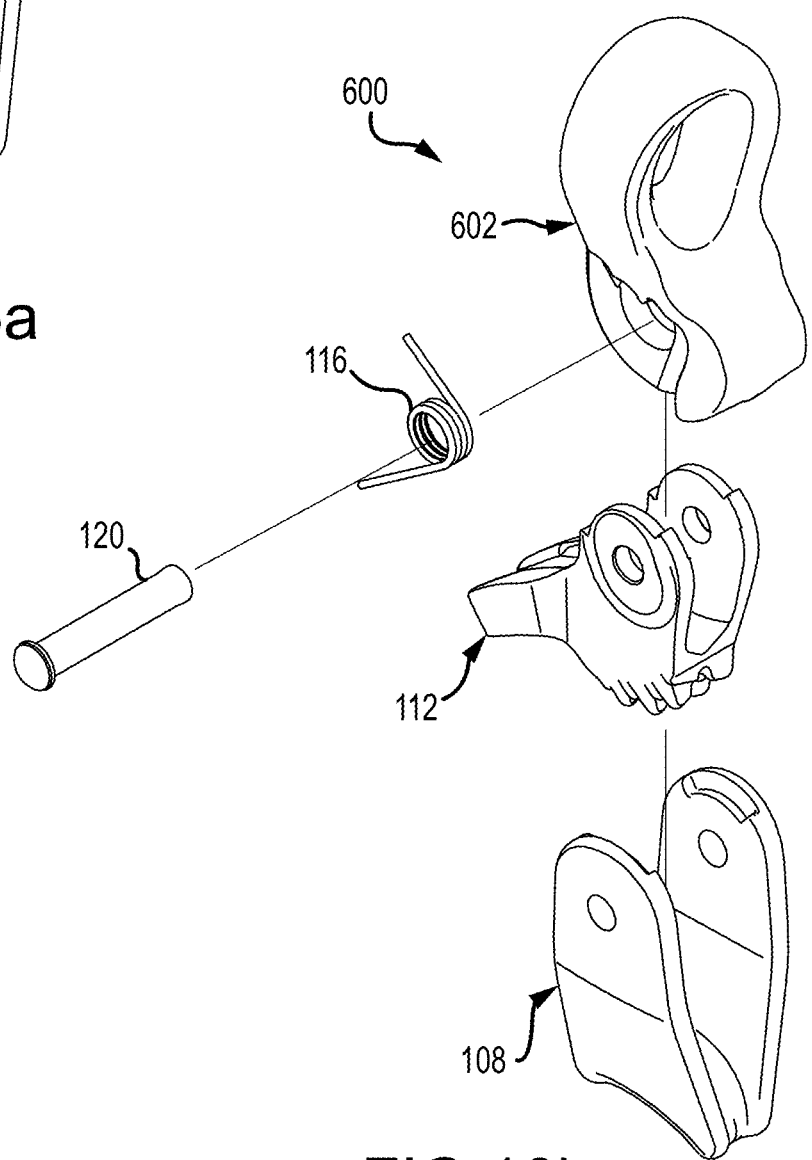

FIG. 16a and FIG. 16b show a device 600 that incorporates a hookless eye loop 602 into the device rather than using a gated hook. Several different uses can be envisioned for this embodiment, such as standalone or paired with other components.

Figure 17A:
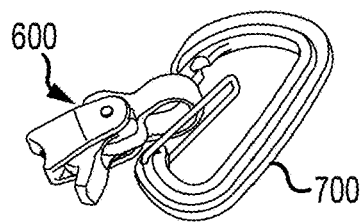
FIG. 17a shows the device of FIG. 16a accepting a carabiner.
Figure 17B:
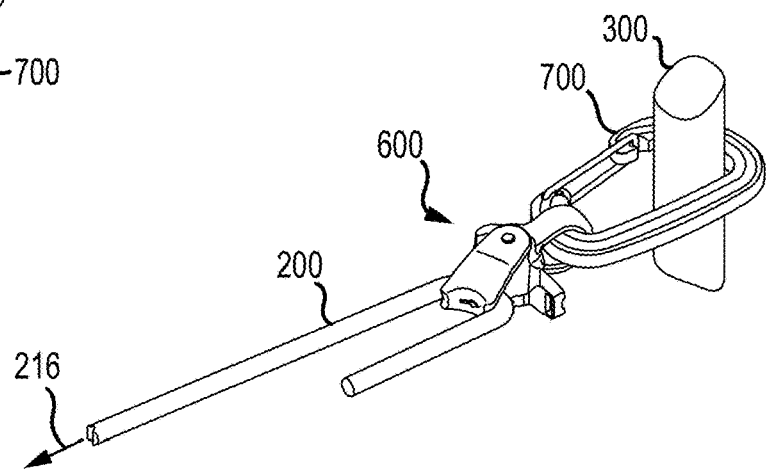
FIG. 17b shows the device of FIG. 17a, wherein the carabiner is engaged onto an anchor.

FIG. 17a and FIG. 17b show the device 600 paired with a generic styled carabiner 700. Functionally, this combination of the device 600 and carabiner 700 is equivalent to that of the device 100 shown in FIG. 4. Additionally, the device 600 can be easily removed from the carabiner, returning the carabiner to its original state. The obvious advantages to this embodiment are that a variety of commercially available carabiners are compatible with the device, and these carabiners can be alternatively used in their original state or quickly converted to a rope tightening device.

Figure 18:
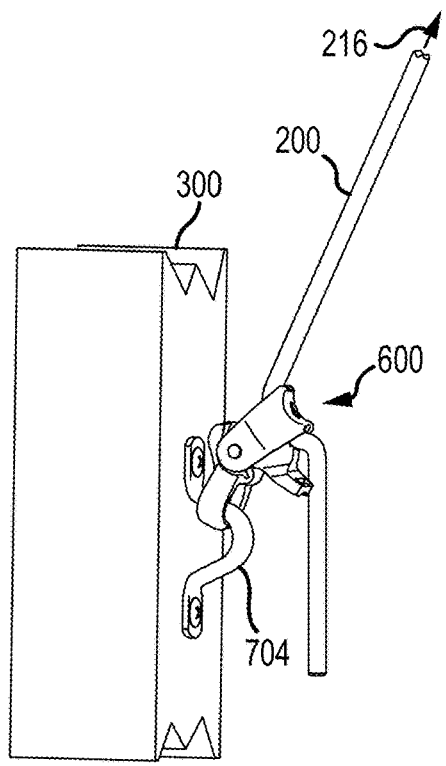
FIG. 18 shows the device of FIG. 16a affixed to a stationary anchor.
Figure 19:
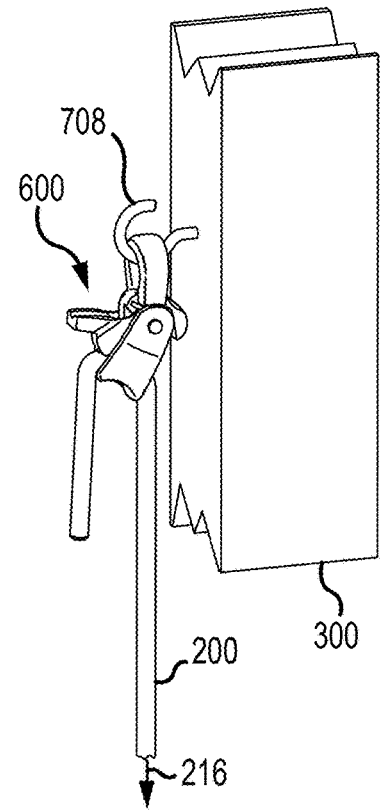
FIG. 19 shows the device of FIG. 16a affixed to a stationary anchor of another design.

FIG. 18 shows the device permanently affixed to an anchor location by means of a closed loop 704 secured to the anchor 300, while FIG. 19 shows the device removably secured to an anchor 300 location by means of an open loop 708 secured to the anchor.

Figure 20A:
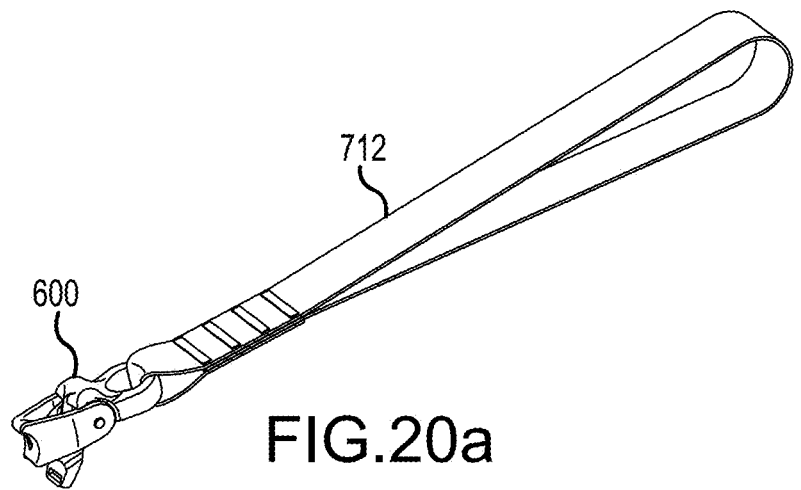
FIG. 20a shows the device of FIG. 16a affixed to a sewn webbing loop.
Figure 20B:
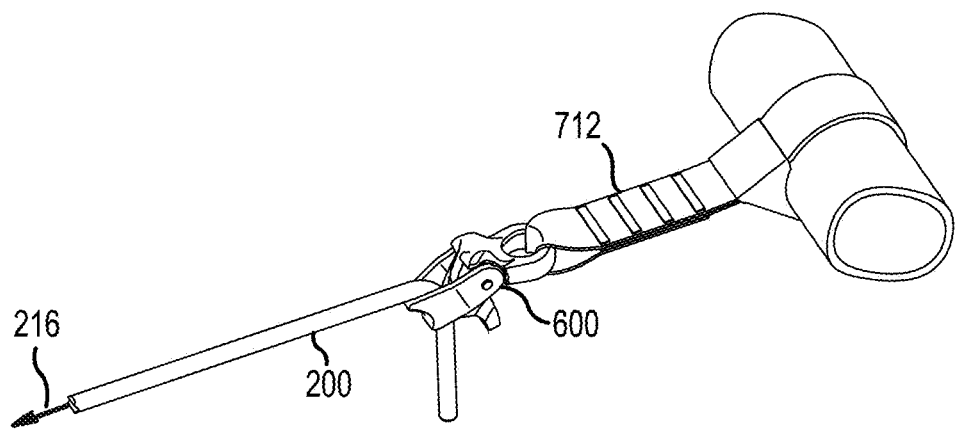
FIG. 20b shows the configuration of FIG. 20a, interconnected to a large diameter anchor.

FIG. 20a and FIG. 20b show a device incorporating a permanently affixed sewn webbing loop 712 with the device 600 described above. One advantage of this embodiment is that large diameter or irregular shaped anchor locations can be easily accommodated. Additionally, this embodiment accentuates the advantage of aligning the tensile load 216 in the rope 200, the rope cradle, the cam lever, and the hookless eye loop 602 to a fixed anchor location to minimize off-axis stresses in the system.

While some of the components described herein as being constructed from die-cast aluminum, various other materials and manufacturing processes could be utilized to produce the components without departing from the scope of the invention. One example would be to utilize glass-filled thermoplastics, molded to produce the hook, cam lever, and/or rope cradle, where such materials would be economically and structurally compatible with the use of elastomeric cordage.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A rope restraining device, comprising:
    a hook adapted for interconnection to an anchor;
    a cradle rotatably interconnected to the hook, the hook comprising a first side wall and a second side wall that are interconnected by a bottom wall, the first side wall and second side wall comprising a taper near the bottom wall, wherein:
        the bottom wall in a lateral direction between the first side wall and the second side wall has a cylindrical profile defined by a linear cross section, and
        the bottom wall is an axial direction extending from a proximal end of the cradle to a distal end of the cradle has an arcuate profile relative that extends from a bottom surface of the cradle, wherein the arcuate profile relative to the bottom surface, and wherein portions of the first side wall and the second side wall bound the arcuate profile;
    a cam lever positioned within the cradle and configured to rotate relative to the cradle, the cam lever having a grip geometry comprised of a plurality of teeth that faces the arcuate profile, the grip geometry having a first lateral width at a proximal end that and a second lateral width at a distal end that is less than the width of the first lateral width;
    wherein the distal end of the cam lever is biased toward the distal end of the cradle; and
    wherein rotation of the cam lever separating the distal end of the cam lever from the distal end of the cradle creates an opening between the grip geometry and the bottom wall of the cradle that is adapted to receive ropes of more than one diameter; and
    wherein rotation of the cam lever in an operation of the distal end of the cam lever toward the distal end of the cradle decreases the size of the opening, and prevents withdrawal of the rope from the cradle in a direction that generally corresponds with the proximal end of the cradle.

2. The device of claim 1, wherein the cam lever has proximal hard stops and distal hard stops that cooperate with corresponding proximal hard stops and distal hard stops on the hook that limit cam lever rotation, and wherein the first side wall and second side wall of the cradle have notches that receive portions of the hook that limit cradle rotation.

3. The device of claim 2, wherein the cam lever and cradle have different rotation limits.

4. The device of claim 1, wherein the cam lever and cradle are rotatably interconnected to the hook by a pivot pin, wherein rope tension will impart rotation of the cradle and/or cam lever relative to the hook, and wherein the relative rotation of the cradle and the cam lever align a force vector associated with the rope tension with the pivot pin and a centroid of the hook to reduce off-axis loading of the device.

5. The device of claim 1, wherein the grip geometry possesses a groove extending from the proximal end to the distal end.

6. The device of claim 1, wherein the plurality of teeth are defined by structures with a short lateral edge and a long lateral edge with a groove therebetween, and wherein the short lateral edge and long lateral edge alternate from one tooth to the next.

\* \* \* \* \*

UNITED STATES PATENT AND TRADEMARK OFFICE
CERTIFICATE OF CORRECTION

PATENT NO. : 12,234,883 B1
APPLICATION NO. : 18/788387
DATED : February 25, 2025
INVENTOR(S) : Rex Seader Page 1 of 1

It is certified that error appears in the above-identified patent and that said Letters Patent is hereby corrected as shown below:

In the Specification

Column 4, Line 14 – "hook comprising" should be -- cradle comprising --.
Column 4, Line 46 – "hook comprising" should be -- cradle comprising --.
Column 5, Line 16 – "hook comprising" should be -- cradle comprising --.
Column 5, Line 54 – "hook comprising" should be -- cradle comprising --.
Column 6, Line 25 – "hook comprising" should be -- cradle comprising --.
Column 6, Line 58 – "hook comprising" should be -- cradle comprising --.
Column 7, Line 29 – "literal" should be -- linear --.
Column 7, Line 44 – "literal" should be -- linear --.
Column 7, Line 62 – "literal" should be -- linear --.
Column 8, Line 14 – "literal" should be -- linear --.
Column 8, Line 36 – "literal" should be -- linear --.
Column 8, Line 52 – "literal" should be -- linear --.
Column 9, Line 5 – "literal" should be -- linear --.
Column 9, Line 30 – "literal" should be -- linear --.

In the Claims

Claim 1 – Column 18, Line 10 – "hook comprising" should be -- cradle comprising --.

Signed and Sealed this
Sixteenth Day of September, 2025

Coke Morgan Stewart
*Acting Director of the United States Patent and Trademark Office*